United States Patent
Zhang et al.

(10) Patent No.: US 11,960,100 B2
(45) Date of Patent: Apr. 16, 2024

(54) HIGH-SPEED IMAGING USING PERIODIC OPTICALLY MODULATED DETECTION

(71) Applicant: University of Tennessee Research Foundation, Knoxville, TN (US)

(72) Inventors: Zhili Zhang, Knoxville, TN (US); Mark Terrell Gragston, Knoxville, TN (US); Cary Dean Smith, Knoxville, TN (US)

(73) Assignee: University of Tennessee Research Foundation, Knoxville, TN (US)

( * ) Notice: Subject to any disclaimer, the term of this patent is extended or adjusted under 35 U.S.C. 154(b) by 688 days.

(21) Appl. No.: 16/757,200

(22) PCT Filed: Jan. 22, 2019

(86) PCT No.: PCT/US2019/014473
§ 371 (c)(1),
(2) Date: Apr. 17, 2020

(87) PCT Pub. No.: WO2019/144092
PCT Pub. Date: Jul. 25, 2019

(65) Prior Publication Data
US 2021/0136319 A1    May 6, 2021

Related U.S. Application Data

(60) Provisional application No. 62/620,223, filed on Jan. 22, 2018.

(51) Int. Cl.
*G02B 27/10* (2006.01)
*G02B 26/08* (2006.01)
(Continued)

(52) U.S. Cl.
CPC ....... *G02B 27/106* (2013.01); *G02B 26/0833* (2013.01); *G03B 39/00* (2013.01); *G06T 3/4084* (2013.01)

(58) Field of Classification Search
CPC .... G02B 26/0833; G03B 39/00; G06T 3/4084
See application file for complete search history.

(56) References Cited

U.S. PATENT DOCUMENTS

| | | | |
|---|---|---|---|
| 4,331,877 A | 5/1982 | Barrett et al. | |
| 6,239,909 B1 * | 5/2001 | Hayashi | G06E 3/003 359/569 |

(Continued)

FOREIGN PATENT DOCUMENTS

WO    WO-2012/069810 A1    5/2012

OTHER PUBLICATIONS

International Search Report and Written Opinion corresponding to U.S Patent Application No. PCT/US2019/014473 dated Apr. 30, 2019.

(Continued)

*Primary Examiner* — Thanh Luu
(74) *Attorney, Agent, or Firm* — Jenkins, Taylor & Hunt, P.A.

(57) ABSTRACT

Methods and systems for imaging a target. In some examples, a system includes an optical modulator configured for applying, at each time of an exposure window, a respective optical modulation pattern to a received image of the target to output a modulated image. The system includes a camera configured for capturing a single image frame for the exposure window by receiving, at each of time, the modulated image of the target. The system includes a demodulator implemented on a computer system and configured for demodulating the single image frame based on the optical modulation patterns to recover a number of recovered image frames each depicting the target at a respective recovered time within the exposure window.

16 Claims, 32 Drawing Sheets

(51) Int. Cl.
*G03B 39/00* (2021.01)
*G06T 3/40* (2006.01)
*G06T 3/4084* (2024.01)

(56) References Cited

U.S. PATENT DOCUMENTS

| | | | |
|---|---|---|---|
| 2003/0020922 | A1 | 1/2003 | Crowley et al. |
| 2008/0219535 | A1 | 9/2008 | Mistretta et al. |
| 2012/0098951 | A1 | 4/2012 | Borovytsky |
| 2013/0136318 | A1 | 5/2013 | Hassebrook et al. |
| 2017/0214861 | A1* | 7/2017 | Rachlin .......... G03B 15/00 |

OTHER PUBLICATIONS

International Preliminary Report on Patentability corresponding to U.S Patent Application No. PCT/US2019/014473 dated Aug. 6, 2020.
Bohlin et al., "Communication: Two-dimensional gas-phase coherent anti-Stokes Raman spectroscopy (2D-CARS): Simultaneous planar imaging and multiplex spectroscopy in a single laser shot," The Journal of Chemical Physics 138, 221101 (2013).
Bub et al., "Temporal pixel multiplexing for simultaneous high-speed, high-resolution imaging," Nature Methods 7, 209 (2010).
Dogariu et al., "High-gain backward lasing in air," Science 331, 442-445 (2011).
Donoho, "Compressed sensing," IEEE Transactions on Information Theory 52, 1289-1306 (2006).
Dorozynska et al., "Implementation of a multiplexed structured illumination method to achieve snapshot multispectral imaging," Optics Express 25, 17211-17226 (2017).
Dromey et al., "High harmonic generation in the relativistic limit," Nature physics 2, 456 (2006).
Ehn et al., "Frame: femtosecond videography for atomic and molecular dynamics," Light: Science & Applications 6, e17045 (2017).
Etoh et al., "Toward One Giga Frames per Second—Evolution of in Situ Storage Image Sensors," Sensors (Basel, Switzerland) 13, 4640-4658 (2013).
Etoh et al., "The Theoretical Highest Frame Rate of Silicon Image Sensors," Sensors (Basel, Switzerland) 17, 483 (2017).
Gao et al., "Single-shot compressed ultrafast photography at one hundred billion frames per second," Nature 516, 74 (2014).
Gragston et al., "High-speed flame chemiluminescence imaging using time-multiplexed structured detection," Applied Optics 57, 2923-2929 (2018).
Gragston et al., "Single-Shot Nanosecond-Resolution Multiframe Passive Imaging by Multiplexed Structured Image Capture," Optics Express 26, 28441-28452 (2018).
Gustafsson, "Surpassing the lateral resolution limit by a factor of two using structured illumination microscopy," Journal of Microscopy 198, 82-87 (2000).
Hales, "The Honeycomb Conjecture," Discrete & Computational Geometry 25, 1-22 (2001).
Halls et al., "Single-shot, volumetrically illuminated, three-dimensional, tomographic laser-induced-fluorescence imaging in a gaseous free jet," Opt. Express 24, 10040-10049 (2016).
Heintzmann et al., "Laterally modulated excitation microscopy: improvement of resolution by using a diffraction grating," in BiOS Europe '98, (SPIE, 1999), 12.
Hsu et al., "Sensitivity, stability, and precision of quantitative Ns-LIBS-based fuel-air-ratio measurements for methane-air flames at 1-11 bar," Applied Optics 55, 8042-8048 (2016).
Kristensson et al., "Two-pulse structured illumination imaging," Opt. Lett. 39, 2584-2587 (2014).
Kristensson et al., "Recent development of methods based on structured illumination for combustion studies," in Imaging and Applied Optics 2016 (Optical Society of America, Heidelberg, 2016), p. LT4F.1.
Kristensson et al., "Instantaneous 3D imaging of flame species using coded laser illumination," Proceedings of the Combustion Institute 36, 4585-4591 (2017).
Liang et al., "Encrypted Three-dimensional Dynamic Imaging using Snapshot Time-of-flight Compressed Ultrafast Photography," Scientific Reports 5, 15504 (2015).
Liang et al., "Single-shot real-time femtosecond imaging of temporal focusing," Light: Science & Applications 7, 42 (2018).
Liang et al., "Single-shot ultrafast optical imaging," Optica 5, 1113-1127 (2018).
Mikami et al., "Ultrafast optical imaging technology: principles and applications of emerging methods," in Nanophotonics 5, 497-509 (2016).
Miller et al., "1-kHz two-dimensional coherent anti-Stokes Raman scattering (2D-CARS) for gas-phase thermometry," Opt. Express 24, 24971-24979 (2016).
Perelomov et al., "Ionization of atoms in an alternating electric field," Sov. Phys. JETP 23, 924-934 (1966).
Schermelleh et al., "A guide to super-resolution fluorescence microscopy," The Journal of Cell Biology 190, 165-175 (2010).
Schwarz et al., "Measurement of nonlinear refractive index and ionization rates in air using a wavefront sensor," Opt. Express 20, 8791-8803 (2012).
Wang et al., "Ultra-high-speed PLIF imaging for simultaneous visualization of multiple species in turbulent flames," Opt. Express 25, 30214-30228 (2017).
Wu et al., "High-energy pulse-burst laser system for megahertz-rate flow visualization," Optics Letters 25, 1639-1641 (2000).
Wu et al., "Quantitative measurement of electron number in nanosecond and picosecond laser-induced air breakdown," Journal of Applied Physics 119, 173303 (2016).
Zhang et al., "Microwave diagnostics of laser-induced avalanche ionization in air," Journal of Applied Physics 100, 6 (2006).
Baccarella et al., "Development and testing of the ACT-1 experimental facility for hypersonic combustion research," Measurement Science and Technology 27, 045902 (2016).
Braun et al., "Self-channeling of high-peak-power femtosecond laser pulses in air," Optics letters 20, 73-75 (1995).
Carter et al., "High-speed planar laser-induced fluorescence of the CH radical using the $C2\Sigma+$—$X2\Pi(0, 0)$ band," Applied Physics B 116, 515-519 (2014).
Duran et al., "Ballistic imaging of diesel sprays using a picosecond laser: characterization and demonstration," Appl. Opt. 54, 1743-1750 (2015).
Goodman, J.W., Introduction to Fourier Optics (Roberts and Company Publishers, 2005).
Hecht, E., Optics (Addison-Wesley, 2002).
Hsu et al., "High-repetition-rate laser ignition of fuel—air mixtures," Opt. Lett. 41, 1570-1573 (2016).
Jiang et al., "High-speed 2D Raman imaging at elevated pressures," Optics Letters 42, 3678-3681 (2017).
Khan et al., "Extracting sub-exposure images from a single capture through Fourier-based optical modulation," Signal Processing: Image Communication 60, 107-115 (2018).
Laurence et al., "Experimental study of second-mode instability growth and breakdown in a hypersonic boundary layer using high-speed schlieren visualization," Journal of Fluid Mechanics 797, 471-503 (2016).
Lee et al., "Time-multiplexed structured illumination using a DMD for optical diffraction tomography," Opt. Lett. 42, 999-1002 (2017).
Linne et al., "Ballistic imaging of the near field in a diesel spray," Experiments in Fluids 40, 836-846 (2006).
Meyer et al., "High-speed, three-dimensional tomographic laser-induced incandescence imaging of soot volume fraction in turbulent flames," Opt. Express 24, 29547-29555 (2016).
Miles et al. "Microwave Scattering from Laser Ionized Molecules: A New Approach to Nonintrusive Diagnostics," Aerospace letters, AIAA Journal, 2007.
Mohri et al., "Instantaneous 3D imaging of highly turbulent flames using computed tomography of chemiluminescence," Applied Optics 56, 7385-7395 (2017).

(56) References Cited

OTHER PUBLICATIONS

Mur et al., "Energy and momentum spectra of photoelectrons under conditions of ionization by strong laser radiation (The case of elliptic polarization)," Journal of Experimental and Theoretical Physics 92, 777-788 (2001).
O'Connor et al., "Transverse combustion instabilities: Acoustic, fluid mechanic, and flame processes," Progress in Energy and Combustion Science 49, 1-39 (2015).
Oppenheim, A.V., Signals & Systems, Prentice-Hall signal processing series (Prentice-Hall International, 1997).
Rankin et al., "Chemiluminescence imaging of an optically accessible non-premixed rotating detonation engine," Combustion and Flame 176, 12-22 (2017).
Sallé et al., "Comparative study of different methodologies for quantitative rock analysis by Laser-Induced Breakdown Spectroscopy in a simulated Martian atmosphere," Spectrochimica Acta Part B: Atomic Spectroscopy 61, 301-313 (2006).
Saxena et al., "Structured illumination microscopy," Adv. Opt. Photon. 7, 241-275 (2015).
Shattan et al., "Detection of uranyl fluoride and sand surface contamination on metal substrates by hand-held laser-induced breakdown spectroscopy," Appl. Opt. 56, 9868-9875 (2017).
Settles, G.S., Schlieren and Shadowgraph Techniques: Visualizing Phenomena in Transparent Media (Springer Berlin Heidelberg, 2012).
Velten et al., "Imaging the propagation of light through scenes at picosecond resolution," Commun. ACM 59, 79-86 (2016).
Wakeham et al., "Dual-echelon single-shot femtosecond spectroscopy," Opt. Lett. 25, 505-507 (2000).
Zhang et al., "Coherent microwave rayleigh scattering from resonance-enhanced multiphoton ionization in argon," Physical Review Letters 98 (2007).

\* cited by examiner

IMAGE
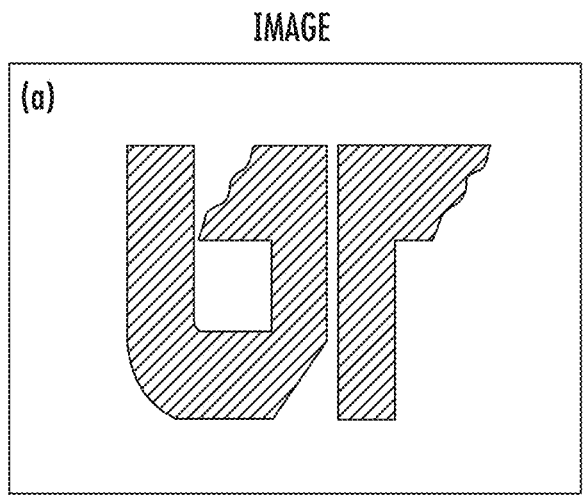
MODULATED IMAGE
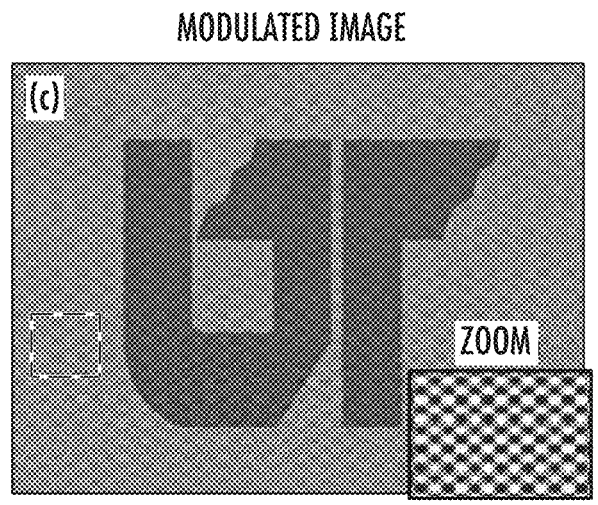
IMAGE FOURIER DOMAIN
FIG. 3A
MOD. IMAGE FOURIER DOMAIN
FIG. 3B
IMAGE FOURIER DOMAIN
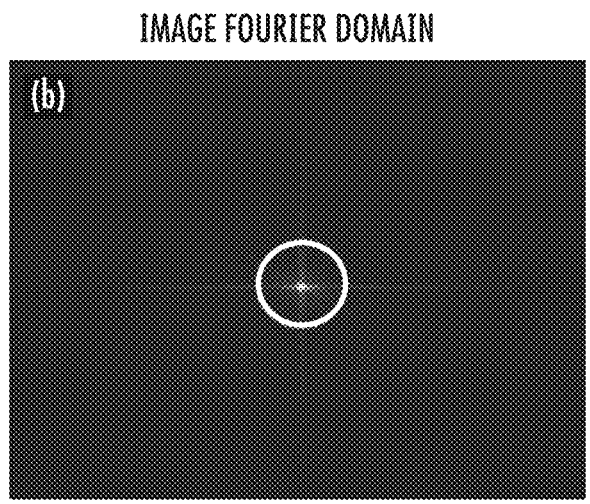
MOD. IMAGE FOURIER DOMAIN
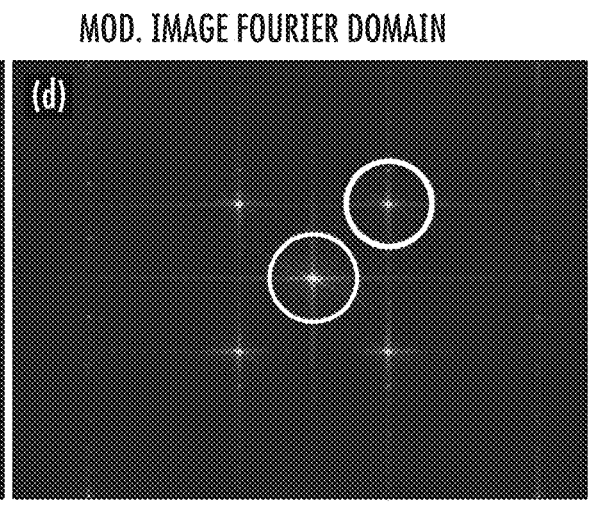
10  11  12  13  14  15  16  17  18
FIG. 3C
FIG. 3D RAW MULTIPLEXED IMAGE
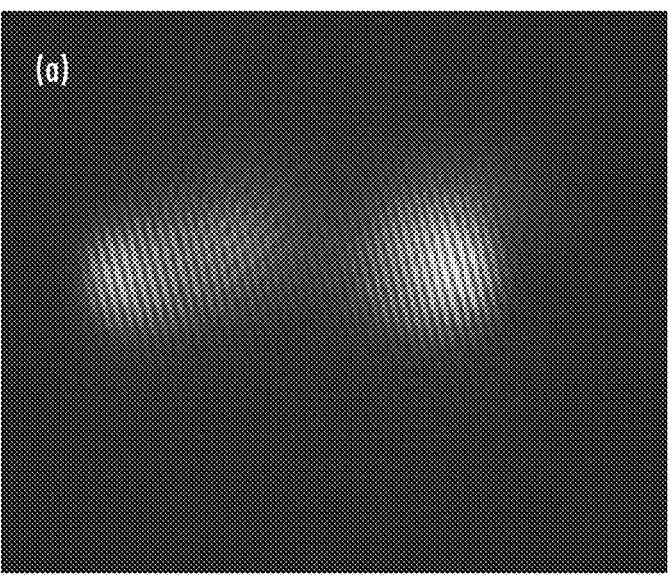
FIG. 15A
MULTIPLEXED IMAGE FOURIER DOMAIN
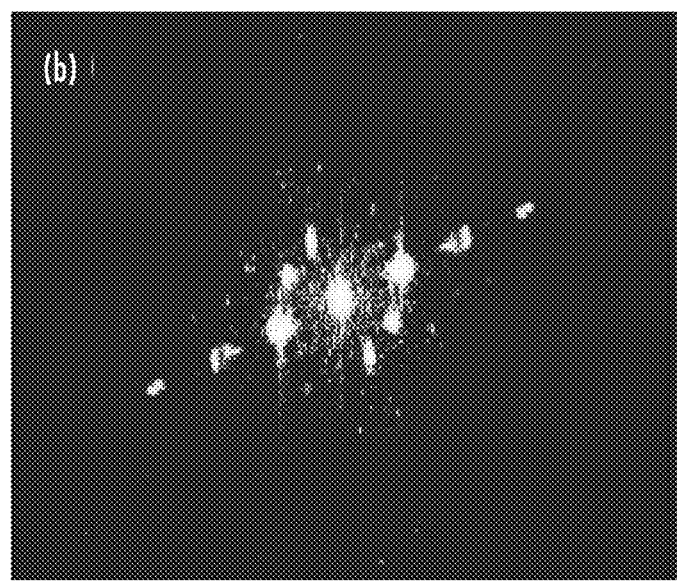
FIG. 15B

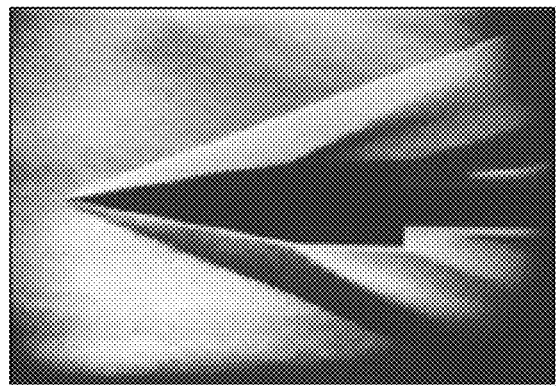
DESIRED FULL SCENE
CAMERA FIELD OF VIEW
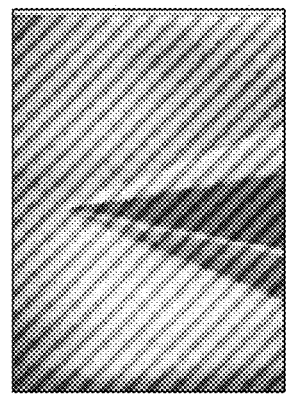
PATH 1 VIEW
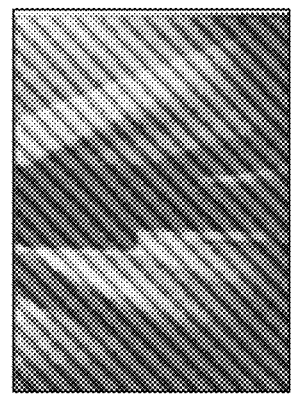
PATH 2 VIEW
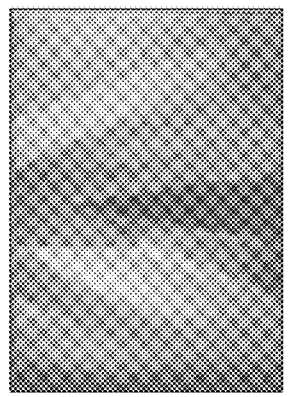
CAPTURED IMAGE
CAN BE SEPARATED USING FOURIER ANALYSIS DURING PROCESSING
FIG. 18C

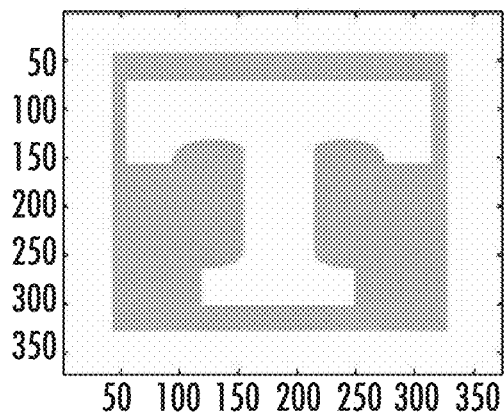
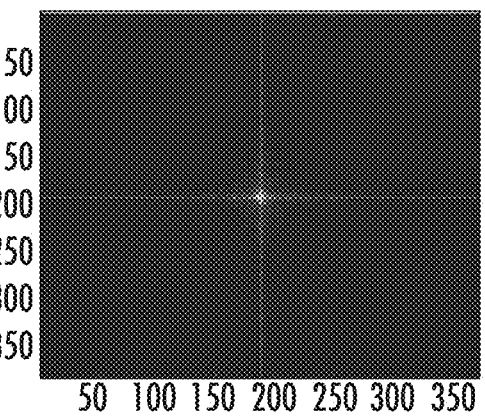
FIG. 19A                    FIG. 19B
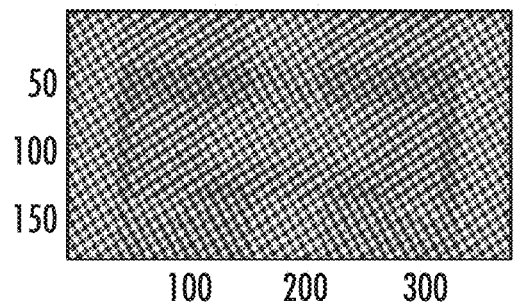
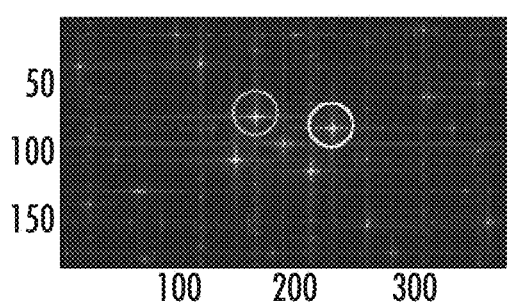
FIG. 19C                    FIG. 19D
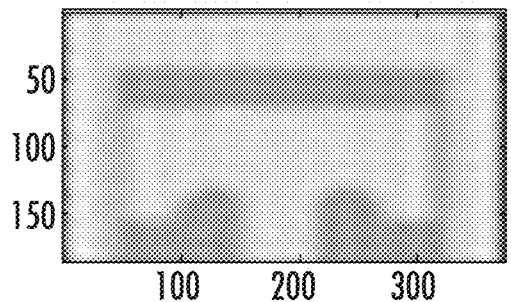
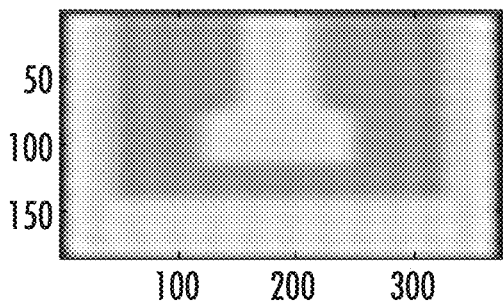
FIG. 19E                    FIG. 19F

HIGH-SPEED IMAGING USING PERIODIC OPTICALLY MODULATED DETECTION

PRIORITY CLAIM

This application claims the benefit of U.S. Provisional Patent Application Ser. No. 62/620,223, filed Jan. 22, 2019, the disclosure of which is incorporated herein by reference in its entirety.

STATEMENT OF GOVERNMENT INTEREST

This invention was made with government support under Contract No. PHY-141 8848 awarded by the National Science Foundation. The government has certain rights in the invention.

TECHNICAL FIELD

This specification relates generally to high-speed imaging using optical modulation, for example, gigahertz or higher rate imaging and measurements.

BACKGROUND

The development of high-speed imaging and measurement systems has been a critical part of optical diagnostics and spectroscopy for decades. The structured illumination (SI) method was developed to bypass the diffraction limits for optical microscopy. The use of SI to obtain super-resolution information simply by illuminating a sample with structured light can be explained in the context of the 'spatial frequency' of an image. Since an optical image collects only low spatial frequency information, high-frequency information is lost after light passes through an objective lens, which sets the classical Abbe diffraction limit. In a typical SI setup, incident light is spatially modulated using a Ronchi ruling, digital micromirror device (DMD), or gratings before it reaches its target. By applying these bar code-like illumination patterns in different orientations and processing all acquired images using computer algorithms, a high spatial resolution image can be obtained. For combustion diagnostics, if one is doing a fluorescence experiment with two wavelengths, one incident laser light can be modulated with a Ronchi ruling and the other can be modulated with a Ronchi ruling at a different angle or spatial frequency. When the image from such an experiment is collected, it will contain information corresponding to each light source can be separated using Fourier domain analysis even though the light was collected during one exposure. This type of setup has been used for various flame and spray measurements.

SUMMARY

This specification describes methods and systems for imaging a target. In some examples, a system includes an optical modulator configured for applying, at each time of an exposure window, a respective optical modulation pattern to a received image of the target to output a modulated image. The system includes a camera configured for capturing a single image frame for the exposure window by receiving, at each of time, the modulated image of the target. The system includes a demodulator implemented on a computer system and configured for demodulating the single image frame based on the optical modulation patterns to recover a number of recovered image frames each depicting the target at a respective recovered time within the exposure window.

In some examples, a system includes one or more beam splitters configured for separating a received image of the target into a number of optical paths each having a different optical length, each path including a respective optical modulator configured to output a respective modulated image of the target. The system includes one or more beam combiners configured for combining the modulated images and a camera configured for capturing a single image frame for an exposure window by receiving, at each of time, an output from the beam combiners of an optical combination of the modulated images of the target. The system includes a demodulator implemented on a computer system and configured for demodulating the single image frame to recover a number of recovered image frames each depicting the target at a respective recovered time within the exposure window.

In some examples, a system includes an optical modulator configured for applying, to each field of view of a number of fields of view of the target, a respective optical modulation pattern to a received image of the target to output a modulated image. The system includes a camera configured for capturing a single image frame for the plurality of fields of view by receiving the modulated images of the target. The system includes a demodulator implemented on a computer system and configured for recovering, from the single image frame, a plurality of recovered image frames each depicting the target from a respective field of view.

The computer systems described in this specification may be implemented in hardware, software, firmware, or any combination thereof. In some examples, the computer systems may be implemented using a computer readable medium having stored thereon computer executable instructions that when executed by the processor of a computer control the computer to perform steps. Examples of suitable computer readable media include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

Thus, it is an object of the presently disclosed subject matter to provide methods and systems for imaging a target.

An object of the presently disclosed subject matter having been stated hereinabove, and which is achieved in whole or in part by the methods and systems disclosed herein, other objects will become evident as the description proceeds when taken in connection with the accompanying Figures as best described herein below.

BRIEF DESCRIPTION OF THE DRAWINGS

FIGS. 3A-3D illustrate the modulation process on an example image. FIG. 3A shows the original image. FIG. 3B shows the spatial frequency of the image. FIG. 3C shows the modulated image by 60 and 120 degree patterns. FIG. 3D shows that the Fourier domain of the modulated image has image information not only at the origin, but also at the spatial frequency of the pattern.

FIG. 15A shows an experiment image of laser-induced plasma with all three channels present and the associated Fourier transform showing the multiplexing. Camera gate delay was set at 4 ns with a gate width of 3 ns. FIG. 15B shows the Fourier transformation of the image, showing multiple modulated spatial frequency components from various optical paths.

FIG. 18C is a diagram showing the effect of the optical multiplexing systems.

FIG. 19A shows an example image and FIG. 19B shows its Fourier transform. FIG. 19C shows a computational example of overlapped, uniquely modulated images, FIG. 19D shows the Fourier transform, and FIG. 19E-19F show the raw recovered images. The rings show the location of the shifted information. Note that the Fourier plots are logarithmic in intensity.

DETAILED DESCRIPTION

Figure 1A:
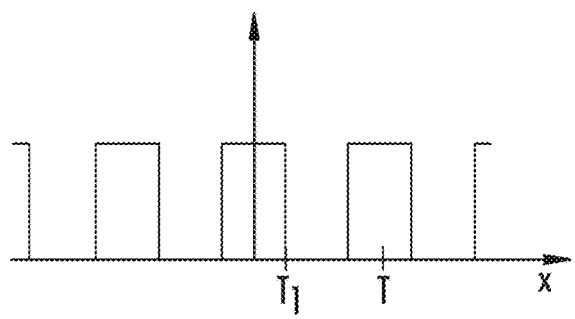
FIG. 1A shows a periodic square wave modulation function and FIG. 1B shows the Fourier transformation. The Fourier domain is an under sampled sinc function or a sinc modulated comb function.

This specification describes methods and systems for high-speed imaging of a target using optical modulation. The methods and systems are described below with reference to three studies that illustrate representative, non-limiting examples of the methods and systems. Section I describes high-speed flame chemiluminescence imaging using time-multiplex structured detection. Section II describes single-shot nanosecond-resolution multiframe passive imaging by multiplexed structured image capture. Section III describes multiplexed structured image capture for single exposure field of view increase.

Section I—High-Speed Flame Chemiluminescence Imaging Using Time-Multiplexed Structured Detection 1. Introduction The development of high-speed imaging and measurement systems has been a critical part of optical diagnostics and spectroscopy for decades. With high-repetition lasers at kilohertz (kHz) [1] and megahertz (MHz) [2] now increasingly common, there is a need for affordable high-speed imaging methods. Furthermore, high-speed imaging is especially desirable for diagnostics of combustion phenomena as shown by recent works on 2D Coherent Anti-Stokes Raman Spectroscopy (CARS) [3, 4], 2D spontaneous Raman scattering [5], and Planar Laser-induced Fluorescence (PLIF) [1, 6] at kilohertz (kHz) or higher rates. Tremendous insights about turbulence, combustion chemistry, and their interactions have been gained through high-speed diagnostics.

The structured illumination (SI) method was developed to bypass the diffraction limits for optical microscopy [7-9]. The use of SI to obtain super-resolution information simply by illuminating a sample with structured light can be explained in the context of the 'spatial frequency' of an image. Since an optical image collects only low spatial frequency information, high-frequency information is lost after light passes through an objective lens, which sets the classical Abbe diffraction limit [10]. In a typical SI setup, incident light is spatially modulated using a Ronchi ruling, digital micromirror device (DMD), or gratings before it reaches its target. By applying these bar code-like illumination patterns in different orientations and processing all acquired images using computer algorithms, a high spatial resolution image can be obtained. For combustion diagnostics, if one is doing a fluorescence experiment with two wavelengths, one incident laser light can be modulated with a Ronchi ruling and the other can be modulated with a Ronchi ruling at a different angle or spatial frequency. When the image from such an experiment is collected, it will contain information corresponding to each light source can be separated using Fourier domain analysis even though the light was collected during one exposure. This type of setup has been used for various flame and spray measurements [11, 12].

In this work, high-speed imaging of flame chemiluminescence is demonstrated using Time Multiplexed Structured Detection (TMSD) imaging method from a single snapshot. TMSD is an idea similar to structured illumination (SI), but only on the detection side of the setup without modification of illumination patterns. Modulation patterns are applied just before imaging, so that images can be separated using an analysis similar to that used for structured illumination. Furthermore, by using a DMD to apply spatial modulations, sub-exposure images corresponding to the rate of DMD operation can be extracted, revealing high-speed information [13]. This will allow any camera to effectively image at the DMD rate of pattern generation.

Additionally, TMSD is a detection method, which can be used for nonlinear optical spectroscopic techniques. It is generally difficult to apply SI to nonlinear spectroscopic techniques of Coherent Anti-stokes Raman Scattering (CARS) [3], Resonance-enhanced Multiphoton Ionization (REMPI) [14], and Laser-induced Breakdown Spectroscopy (LIBS) [15, 16], because the variation of illumination intensity yields nonlinear optical responses which may not be easy to interpret.

2. Theory of Time Multiplexed Structured Detection

Figure 1B:
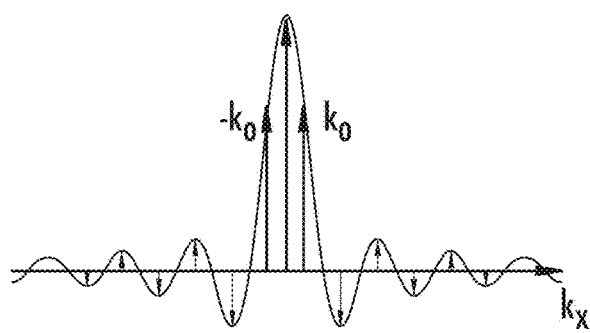

Since structured illumination (SI) and structured detection (SD) are similar, the mathematical formalism is quite similar as well. In both techniques, there are two key steps: modulation and demodulation, as in radio and microwave detections [17]. First the modulation is achieved by either SI [7] or SD. The image I(x,y) detected by a camera is normally the convolution of the object distribution S(x,y) and the point spread function of the optical system H(x,y). For SD, the time-multiplexed image is given by:

$$I(x,y) = [S(x,y) \times M(x,y)] * H(x,y) \qquad 1)$$

where M(x,y) is the modulation pattern, "×" denotes multiplication operator, and "*" denotes the convolution operator. SI modulates the illumination patterns on the target, while SD modulates the image with patterns. Mathematically SI and SD are equivalent within the bracket, i.e., [S(x,y)×M(x,y)]. For this work a periodic square wave is used to model the DMD modulation patterns. For simplicity, consider the case of only an x-dependence for the modulation pattern (i.e. pattern of vertical lines). As shown in FIG. 1, the modulation function is given by $$M(x) = M(x+T) = \begin{cases} 1 & |x| < T_1 \\ 0 & T_1 < |x| \leq T/2 \end{cases} \quad 2)$$

where $2T_1$ is the width of the total transmission, T is the period of the modulation pattern. For a rectangular function, $4T_1=T$. By using convolution theorem, the observed image can be represented in the spatial frequency domain $$\tilde{I}(k_x,k_y)=[\tilde{S}(k_x,k_y)*\tilde{M}(k_x,k_y)]\times\tilde{H}(k_x,k_y) \quad 3)$$

where $k_x$ and $k_y$ denote spatial frequency in x and y directions. The Fourier transformation of the modulation function is [18]:

$$\tilde{M}(k_x, k_y) = \sum_{n=-\infty}^{\infty} \frac{2\sin(nk_0 T_1)}{n}\delta(k_x - nk_0) \quad 4)$$

Thus, a periodic square wave modulation results in an under-sampled sinc function with sampling frequency $nk_0=2\pi n/T$ with $n=1, 2, \ldots$, as shown in FIG. 1. The original modulation function is a periodic rectangular function in spatial domain and is an under-sampled sinc function or a sinc modulated comb function in the spatial frequency domain.

Therefore, combining Eq. 3 and Eq. 4 gives the Fourier transform of an image modulated by a pattern described by Eq. 2 as:

$$\tilde{I}(k_x, k_y) = \left[\tilde{S} * \sum_{n=-\infty}^{\infty} \frac{2\sin(nk_0 T_1)}{n}\delta(k_x - nk_0)\right] \times \tilde{H} \quad 5)$$

Assuming perfect imaging, $\tilde{H}(k_x,k_y)$ can be taken as unity and Eq. 5 reduces to:

$$\tilde{I}(k_x, k_y) = \tilde{S} * \sum_{n=-\infty}^{\infty} \frac{2\sin(nk_0 T_1)}{n}\delta(k_x - nk_0) \quad 6)$$

Therefore, the Fourier domain of the modulated image is comprised of a primary component at $k_x=0$ and higher-order components at harmonics of $k_0$. A key point though is that there is a copy of the image information shifted to the location of each of the harmonics in the Fourier domain. Note however, that the harmonics decrease in magnitude as the order increases due to the decrease of the sinc function. Since the first harmonics are of comparable magnitude to the zeroth harmonic, these will be the focus of the analysis. Furthermore, the background in the Fourier domain suppresses the higher harmonics anyway.

Figure 2:
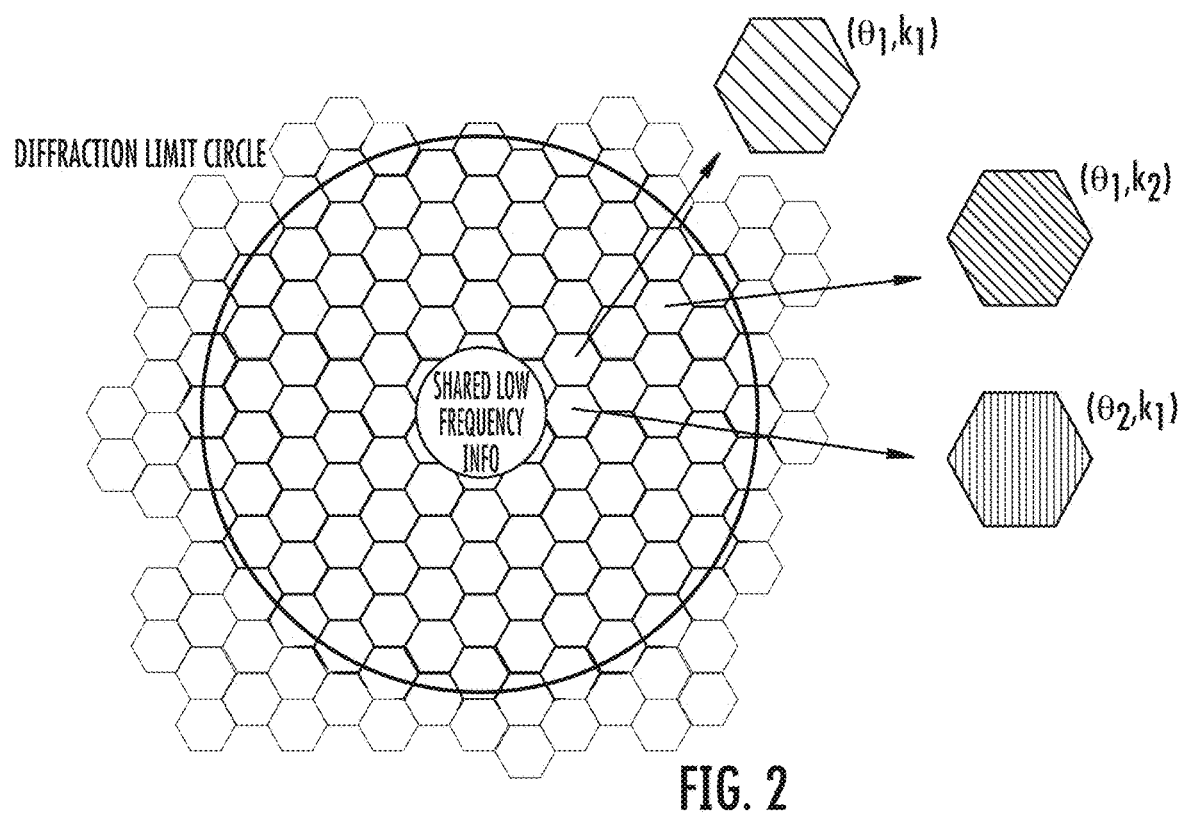
FIG. 2 illustrates the principle of structured detection by heterodyne mixing the low spatial frequency images with various modulation patterns. SD upshifts the original image to various spots (patterned hexagons) in the spatial frequency domain. The limits for multiplexing are enclosed by the physical diffraction limit. Maximum multiplexing is obtained by splitting the frequency domain into hexagons with the size of the hexagon determined by the desired resolution.

FIG. 2 shows a 2D representation of Eq. 3-Eq. 6. The original image is upshifted to various spots (patterned hexagons) in the spatial frequency domain. In 2D, both angle $(\theta_n)$ and distance $(k_n=|\vec{K}_n|)$ can be varied to occupy various locations in the spatial frequency domain. The angle and distance correspond to the orientation angle and period of the patterns, respectively. The higher spatial frequency corresponds to smaller period of $k_n$. The limits for multiplexing are enclosed by the physical Abbe diffraction limit (red circle), after which patterns cannot be resolved and no modulation will occur. The region of low frequency information is near the origin (green circle). Thus, the space leftover to store image information via multiplexing is an annulus. According to mathematics and biology [19], a hexagon pattern is utilized to maximize the Fourier domain utilization such that a maximum spatial frequency modulation can be achieved.

FIG. 3 shows the modulation process on the UT logo. Two spatially modulated channels at 60° and 120° are used to code the image. In the spatial frequency domain, each channel corresponds to separate spots. It is clear that the modulation patterns produce higher harmonics with copies of the image information. A variety of patterns can be used for image modulation, varying in spatial frequency and angle. The radial $(k_n)$ and angular $(\theta_n)$ separations in the spatial frequency domain uniquely determines the spatial modulations. Accumulative exposures by the multiple channels are captured in a single image. FIG. 3(c) is an example of the single image from multiple channels. In FIG. 3(d) The corresponding image in the frequency domain shows two distinct modulations at 60° and 120°. The blue and green circles correspond to shared low spatial frequency info and the 60° shifted image, respectively.

Second, demodulation and reconstruction can be conducted by selectively localizing high frequency info to bypass the diffraction limit or low frequency info to time-multiply single exposure [13, 20, 21]. Here the spatially modulated images are demodulated or recovered by homodyne mixing with the modulation patterns and bandpass filtering around the first harmonics of the resultant homodyne mixing images. However, the image will still have the modulation pattern applied to it and will be lower resolution due to the filtering process. In order to recover an image without modulation from one of the offsets, it is necessary to first shift it back to the center of the Fourier domain. This can be done using the methodology for structured illumination [20]. Mathematically, it is equivalent to homodyne mixing with two reference patterns with 90° phase shift in the spatial domain [14].

Consider a pattern with only x-direction modulation (i.e. horizontally patterned stripes). Reference sine and cosine functions are first multiplied by the complete modulated image:

$$R_s(x,y)=I(x,y)\sin(k_0 x+\phi_x) \quad 7)$$

$$R_c(x,y)=I(x,y)\cos(k_0 x+\phi_x) \quad (8)$$

The modulated light, $S(x,y)\times M(x,y)$, can be expressed as a sum of various frequency components:

$$S(x, y) \times M(x, y) = A_0 + \sum_{n=1}^{\infty} A_n \sin(nk_0 x + \phi) \quad 9)$$

If $H(x,y)=1$ (i.e. ideal imaging), then Eq. 7 and Eq. 8 become:

$$R_s = \left[A_0 + \sum_{n=1}^{\infty} A_n \sin(nk_0 x + \phi)\right]\sin(k_0 x + \phi_x) \quad (10)$$

$$R_c = \left[A_0 + \sum_{n=1}^{\infty} A_n \sin(nk_0 x + \phi)\right]\cos(k_0 x + \phi_x) \quad (11)$$

Carrying out the multiplication and applying appropriate trigonometric relations yields:

$$R_s(x, y) = A_0\sin(k_0 x + \phi_x) + \qquad (12)$$
$$\sum_{n=1}^{\infty} \frac{A_n}{2}[\cos([n-1]k_0 x + \phi - \phi_x) - \cos([n+1]k_0 x + \phi + \phi_x)]$$

$$R_c(x, y) = A_0\cos(k_0 x + \phi_x) + \qquad (13)$$
$$\sum_{n=1}^{\infty} \frac{A_n}{2}[\sin([n-1]k_0 x + \phi - \phi_x) + \sin([n+1]k_0 x + \phi + \phi_x)]$$

A low pass filter can be used on these two equations to allow only the terms $$\frac{A_1}{2}\cos(\phi - \phi_x)$$

from Eq. 12 and $$\frac{A_1}{2}\sin(\phi - \phi_x)$$

from Eq. (13) to remain. Then the recovered and unmodulated image is given by:

$$I_{rec} = \sqrt{\frac{A_1^2}{4}[\sin^2(\phi - \phi_x) + \cos^2(\phi - \phi_x)]} = \frac{A_1}{2} \qquad (14)$$

Figure 4A:
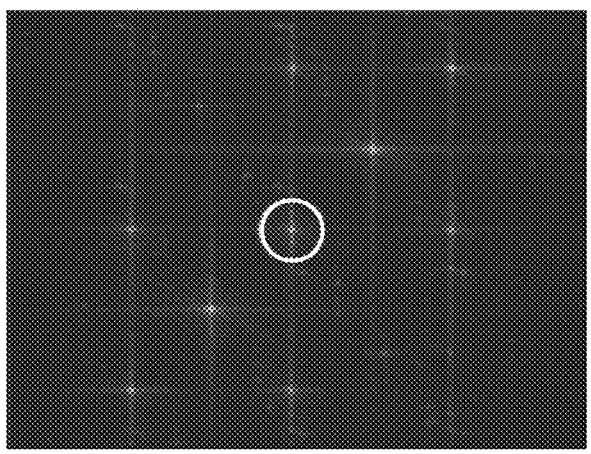
FIG. 4A shows a shifted Fourier domain from the demodulation procedure. The circle shows match with FIG. 3D and filter range.
Figure 4B:
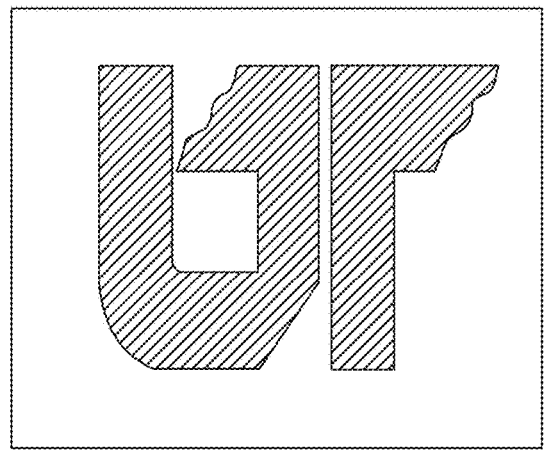
FIG. 4B shows the recovered image from the demodulating process. The resolution around the letter edges is reduced in comparison to FIG. 3A.

FIG. 4A shows the effect of multiplying the image by one of the reference patterns in the Fourier domain. The center of the Fourier domain image is the origin, and it's clear that one of the harmonics has been shifted to the center. Once the a low-pass filter is applied, the demodulated image is recovered, as shown in FIG. 4B. [20]

While an image can be recovered in both SI and SD experiments, there are effects on the image quality. First, because filtering in the Fourier domain is equivalent to convolution of the image with the inverse-Fourier transform of the filtering function, there is naturally a loss in spatial resolution [22]. This is also apparent when one considers that filtering essentially determines a cutoff spatial frequency used in the recovery, and thus determines a resolution limit in the resulting image [13]. A second effect is the approximation of the square wave modulation pattern with a sinusoidal pattern during the recovery. This effect causes extra but weak artifacts to appear in the Fourier domain, as seen in FIG. 4B. It should be noted that others have developed sinusoidal patterning on a DMD; however, there can be limitation on patterning speed when using this approach and hence, it was not used here [23]. Finally, if the shifted harmonics from different patterns are too close to each other in the Fourier domain, there is the possibility of information leakage between the two (i.e. overlap). This would put a limit on the filter size and hence the resolution. However, a hexagonal pattern should minimize the leakage. It should be noted that a limiting factor is the saturation of the camera. If too many images are stacked, it is possible that pixels would get saturated and no spatial frequency can be recovered.

3. Experimental Setup

Figure 5:
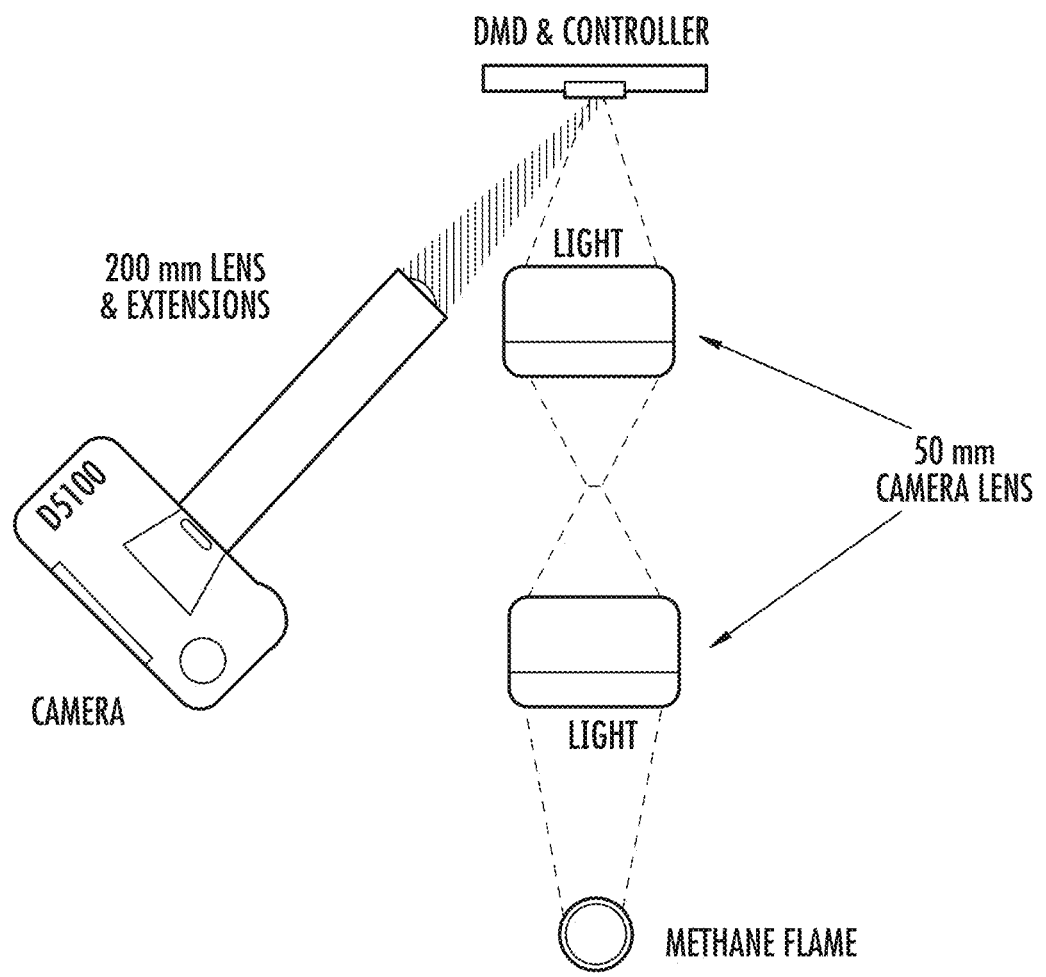
FIG. 5 is a top view of an experiment setup.
Figure 6A:
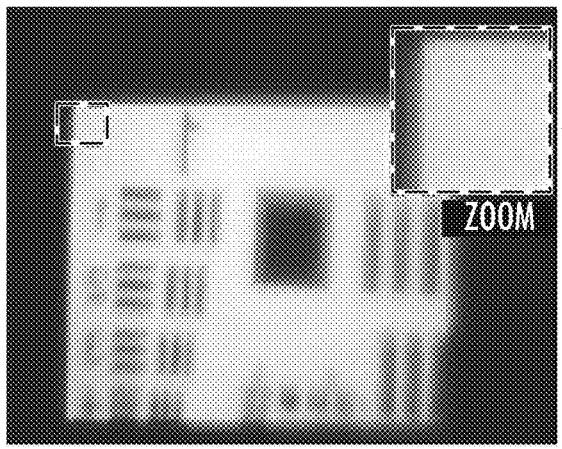
FIGS. 6A-6F illustrate the effects of Fourier domain filtering on image recovery. The example image is of a USAF optical test pattern, and the filter radii are 7150, 10,000, 12,500, and 24,310 rad/mm$^{-1}$.
Figure 6B:
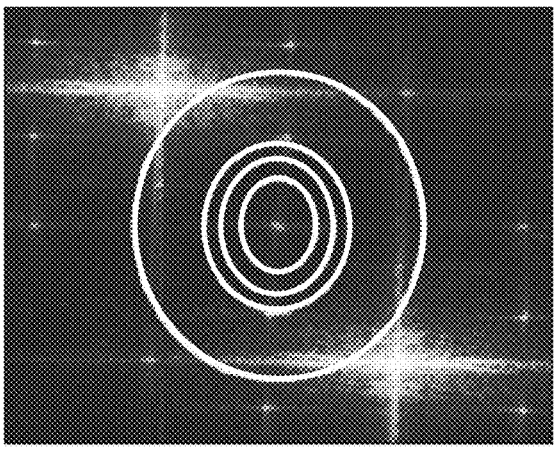
Figure 6C:
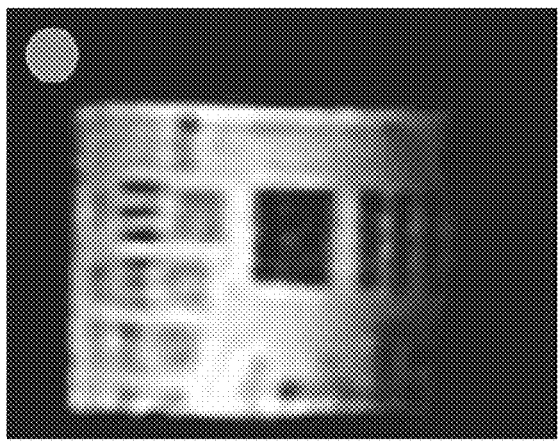
Figure 6D:
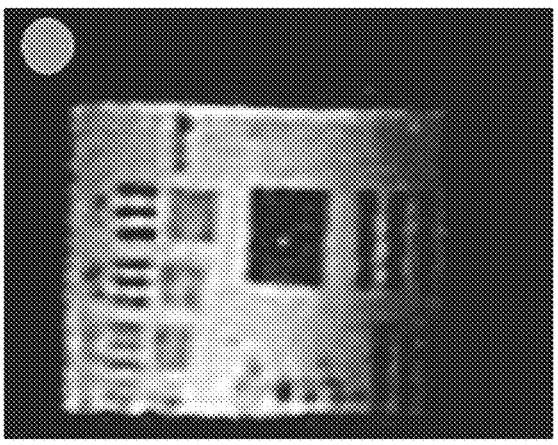
Figure 6E:
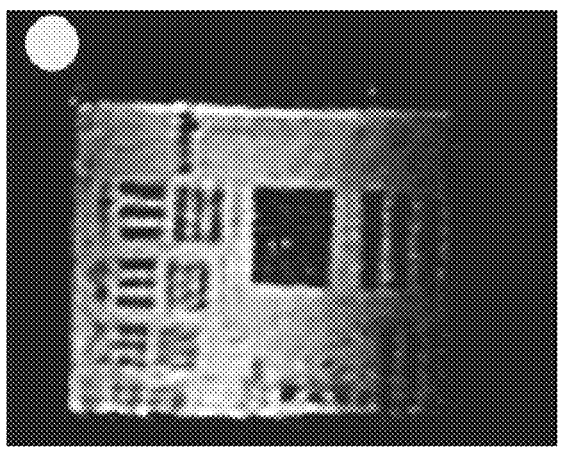
Figure 6F:
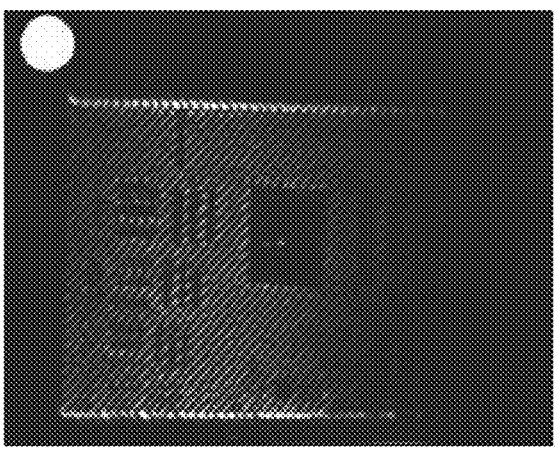

FIG. 5 shows the experimental setup. Two camera lenses (Nikkon Nikkor 50 mm) were used to image the test objects onto the DMD (Texas Instruments DLP 4500, the cost is less than $1000 as 2018). A 200 mm lens was then used to collect and focus the reflected and modulated light from the DMD onto a standard consumer Nikon D5100 camera with a maximum continuous shooting speed of 4 frames per second. A methane diffusion flame was used during flame imaging. Methane flow rate was 0.75 SLPM through a tube with inner diameter 9.5 mm. Acoustic modulation of the flame at 60 Hz was done to better show flame movement. A 25.4 cm acoustic transducer placed next to the flame provided the modulation.

The DMD pattern generation relies on images being preloaded onto the device, which only holds two 24-bit images. After creating twelve binary images of the desired patterns, a single 24-bit image was constructed using the DMD software, such that each binary image was stored in a bit of the 24-bit image. Individual patterns could then be selected by choosing the corresponding bit within the software. For this work, patterns were set for and exposure time of 1 ms to demonstrate kHz imaging.

4. Results and Discussions

First the TMSD is demonstrated on imaging a stationary USAF target to illustrate the impacts of low-pass filtering on the final image reconstruction. As previously mentioned, the individual images can be recovered from the time-multiplexed image by demultiplexing, which involves shifting the first-order harmonic corresponding to a particular patterned image to the center and applying a low-pass filter. This filtering has significant impact on the quality of the recovered image.

FIG. 6 shows recovered images of a USAF optical test pattern using Gaussian filters of various sizes, each of which are annotated by the colored circles in FIG. 6(*b*). Note that anything outside of the circle was set to zero during the image recovery processes. As the size of the filter increases, it allows increasingly higher spatial frequency information to be incorporated into the recovered image, which results in better spatial resolution. The recovered images for first two filter sizes in FIG. 6 (*c*) and (*d*) show that the larger filter size improves spatial resolution of the image, as smaller USAF target groups can be seen more clearly. Furthermore, note that low-frequency structures like the large square have very good resolution in both cases. Care must be taken when considering the filter size, however, since a large filter may also allow information from another modulation pattern to leak into the recovered image. This effect is seen for the two largest filter sizes in FIG. 6(*f*), which shows clear interference from a nearby zero-order modulation pattern.

Thus, to apply SD for high-speed measurements, it is best to determine the desired spatial resolution and then choose the number of modulation patterns. Once the number of patterns is known, the hexagonal patterning can be applied to maximize frequency domain usage. Mathematically, the spatial resolution of time-multiplexing images is reduced and controlled by the low-pass filter, i.e., the size of the various circles in FIG. 4(*b*). It is inherently determined by the uncertainty principle of Fourier transformation, $\Delta f_x \cdot \Delta x \geq 1$, where $\Delta x$ is the spatial resolution and $\Delta f_x$ is the filter size.

Hexagon oriented patterns are chosen to maximize the frequency modulation and minimize the interference from higher harmonics. There are three key steps to properly design a hexagon oriented pattern. First, in a typical setup, the camera takes multiple images with different modulation frequencies, ranging from 1 pixel per cycle up to 20 pixels per cycle. This step determines the maximum spatial resolution of the system, i.e., the red circle in FIG. 2. As in this setup, the maximum spatial resolution is about 6 pixels per cycle. Second, take some images of the test target with DMD fully open to determine the spatial frequency components in the target. The minimum modulation frequency should be beyond the strong features, i.e., green circle in FIG. 2, by half width of the filter size. Third, the patterns must be chosen at dispersedly as possible to minimize interference from both nearby peaks and high harmonics. The separation of various peaks is determined by the filter size. The angle of the various peaks should not be the same, since the Fourier transformations of the modulation function is a sinc function, which has higher harmonics.

Figure 7A:
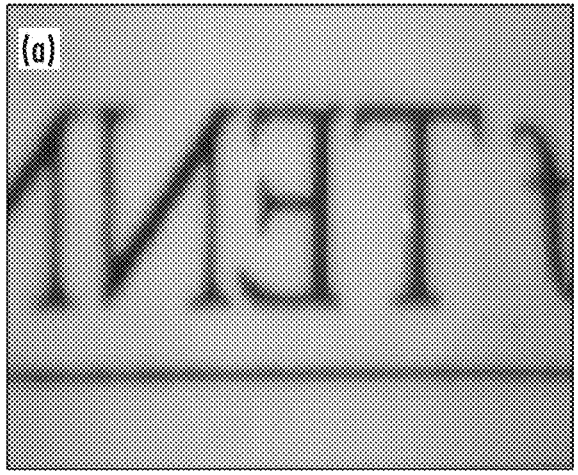
FIG. 7A shows a control image.
Figure 7B:
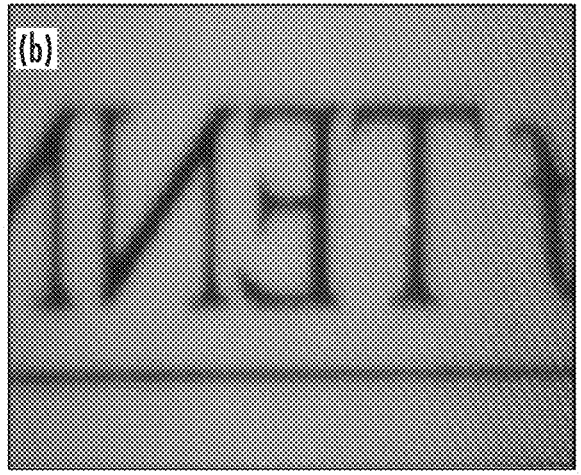
FIG. 7B shows an image with 3 modulation patterns.
Figure 7C:
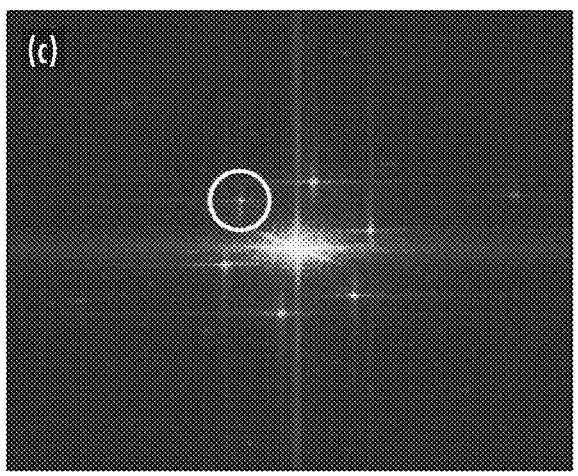
FIG. 7C shows the Fourier transform of the modulated image.
Figure 7D:
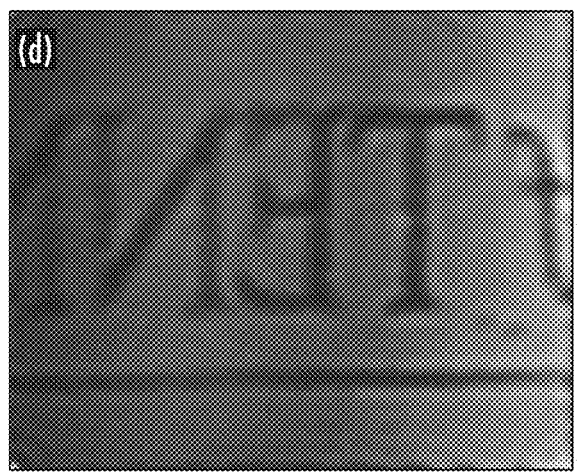
FIG. 7D shows the image recovered from modulation. The circle in FIG. 7C indicates the offset information used for recovery in FIG. 7D.
Figure 8:
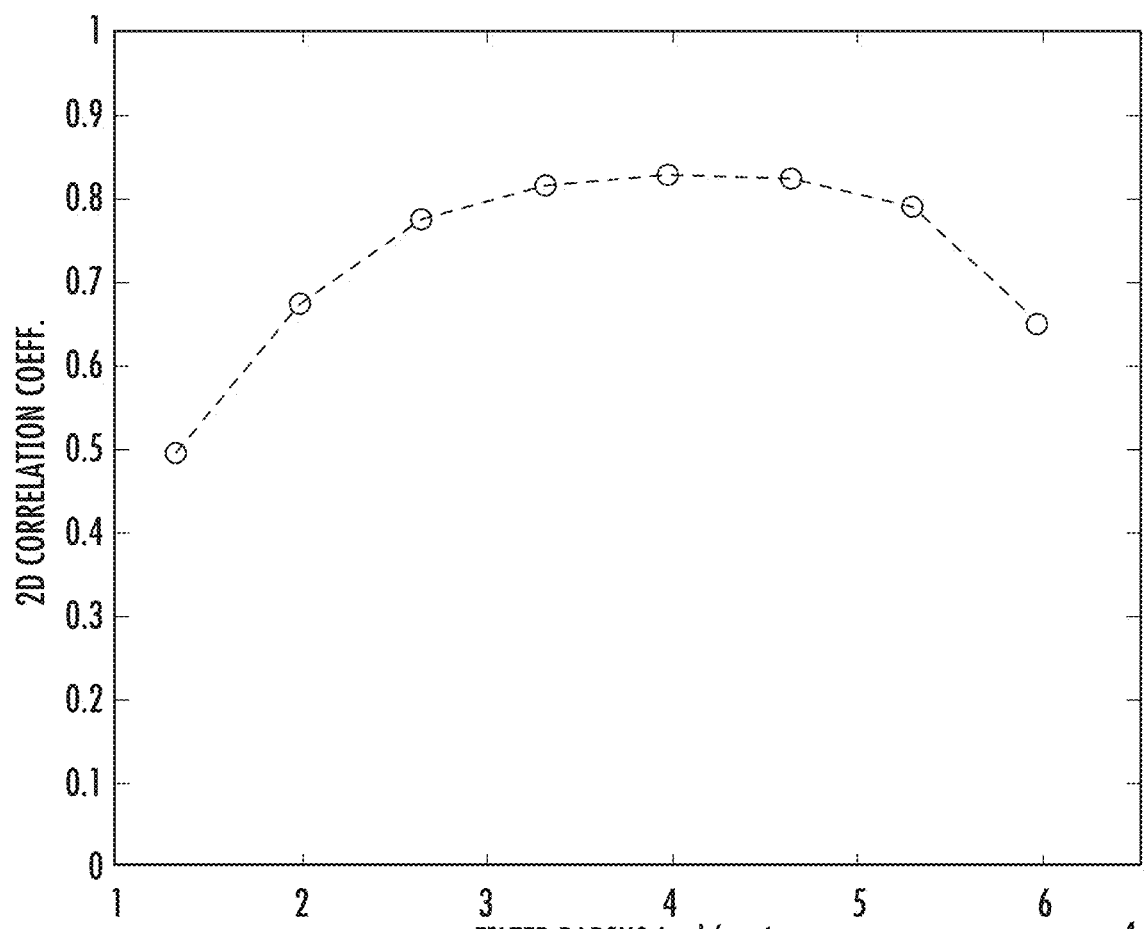
FIG. 8 is a plot of image correlation results as a function of filter radius.

To further understand the choice of filter size on the recovered image and to compare the recovered image to an actual image, a still image of a card with printed letters was imaged, as shown in FIGS. 7A-7D. Three patterns were used to modulate the image, resulting in the shifts shown in FIG. 7A. In order to quantify the accuracy of the recovered image, the two-dimensional correlation coefficient between a recovered image and the control image, which is a measure of image similarity. The image correlation results are shown in FIG. 8 as a function of filter radius. In FIG. 7D, the reconstructed image corresponds to the highest correlation value, 0.827, in FIG. 8. Thus, the recovered image shows very good correlation to the control image.

Figures 9A, 9B:
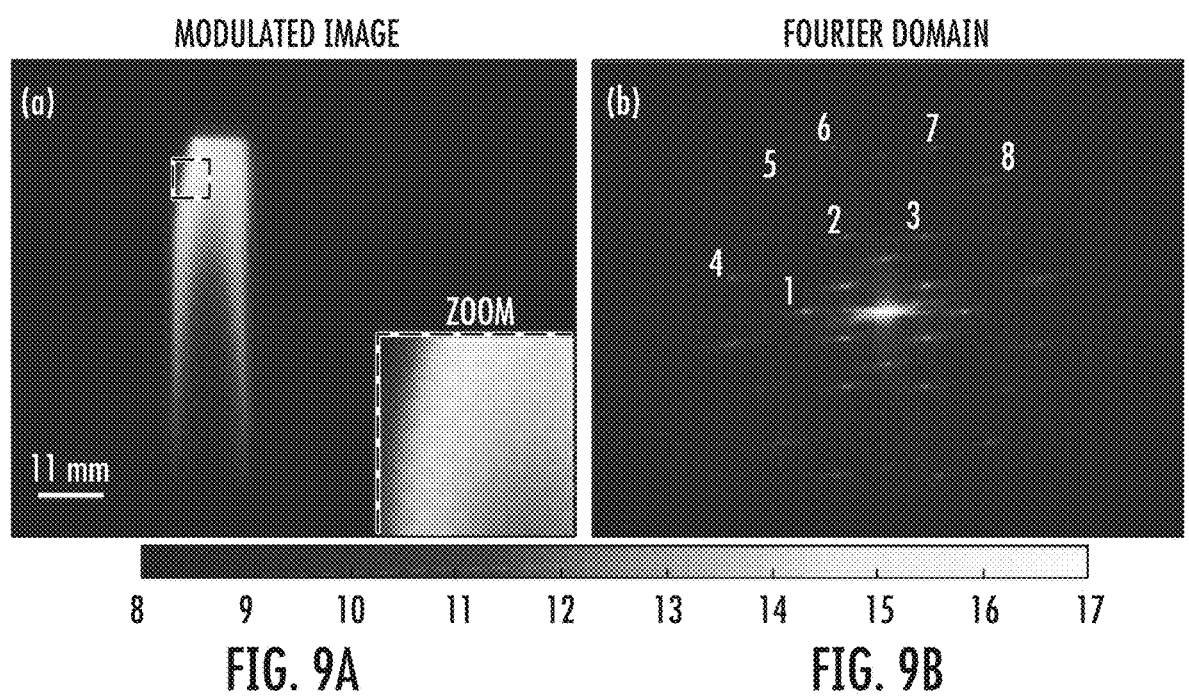
FIG. 9A shows a single snapshot image of a slowly varying Bunsen flame by a commercial DLSR camera with 12 modulation patterns looping at 1 kHz.
FIG. 9B shows the Fourier transformation of the snapshot. Numbers correspond to sequential images in FIG. 10.

FIG. 9 shows a single snapshot image of a methane diffusion flame captured by the Nikon DLSR camera and corresponding Fourier transformation. The total exposure time of the camera was 12 ms with an ISO setting at 400. 12 hexagon patterns were used to loop continuously by the DMD. Each of the pattern has 1 ms exposure time. The hexagon oriented patterns were used. The spatial frequencies are 6 pixels per cycle at 169.1°, 130.9°, 109.1°, 70.89°, 49.11°, 10.89°, 12 pixels per cycle at 120°, 60°, 0°, and 20 pixels per cycle at 30°, 90°, 150°. A clear representation of the hexagon oriented patterns is shown in the Fourier transformation of the modulated snapshot image in FIG. 9(b).

Figure 10:
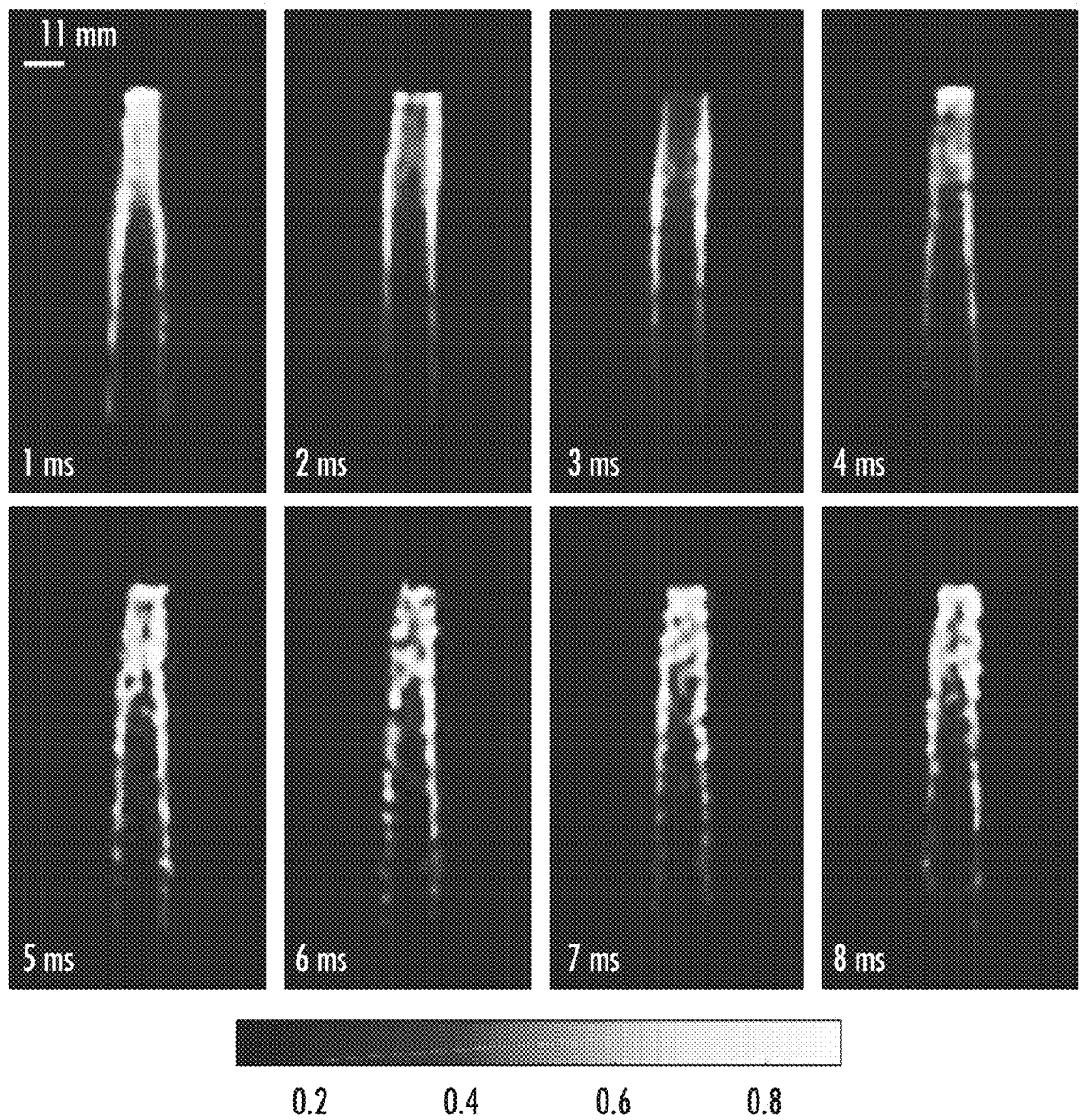
FIG. 10 shows recovered images of methane diffusion flame chemiluminescence from FIG. 9(a). A filter radius of 10,000 rad/mm$^{-1}$ was used.

FIG. 10 shows some recovered sequential images of the flame from the single shot in FIG. 9(a). 1 kHz imaging of the flame can thus be achieved by the time multiplexing and demodulation process. Note, that the bottom four images have slightly worse spatial resolutions due to their location in the Fourier domain near the resolution limit of the setup, which limits the filter size.

Figure 11A:
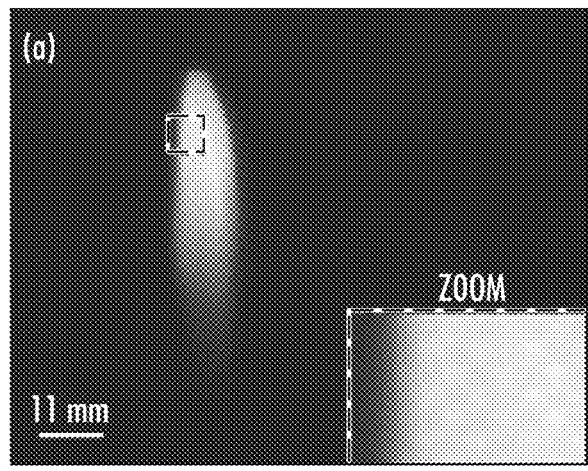
FIG. 11A shows a single snapshot image of a diffusion flame subject to 60 Hz acoustic modulated with 12 modulation patterns looping at 1 kHz.
Figure 11B:
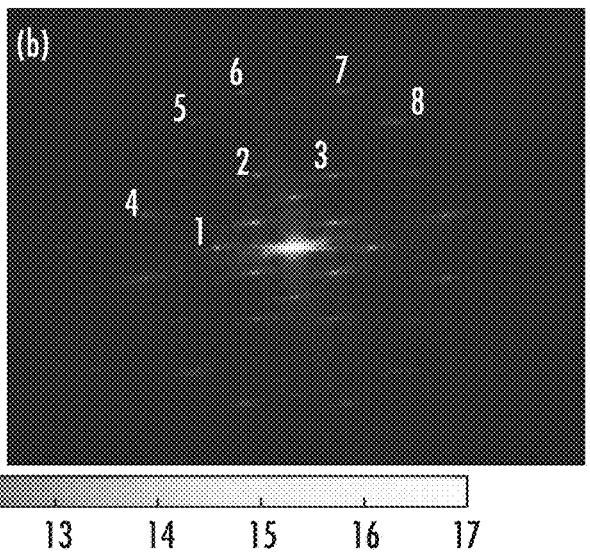
FIG. 11B shows the Fourier transformation of the image. Numbers correspond to sequential images in FIG. 12.

FIG. 11 shows the modulated image and corresponding Fourier transformation for the flame being acoustically modulated by 60 Hz. The same hexagon oriented patterns were used. The flame was clearly oscillating due to acoustic modulation and can be regarded as a simplified version for thermoacoustic oscillation experiments in combustion instability study.[24, 25] Compared to FIG. 9, the oscillation in different images were more significant, showing different intensities in the various locations in the modulated image, different peak intensities in the Fourier domain.

Figure 12:
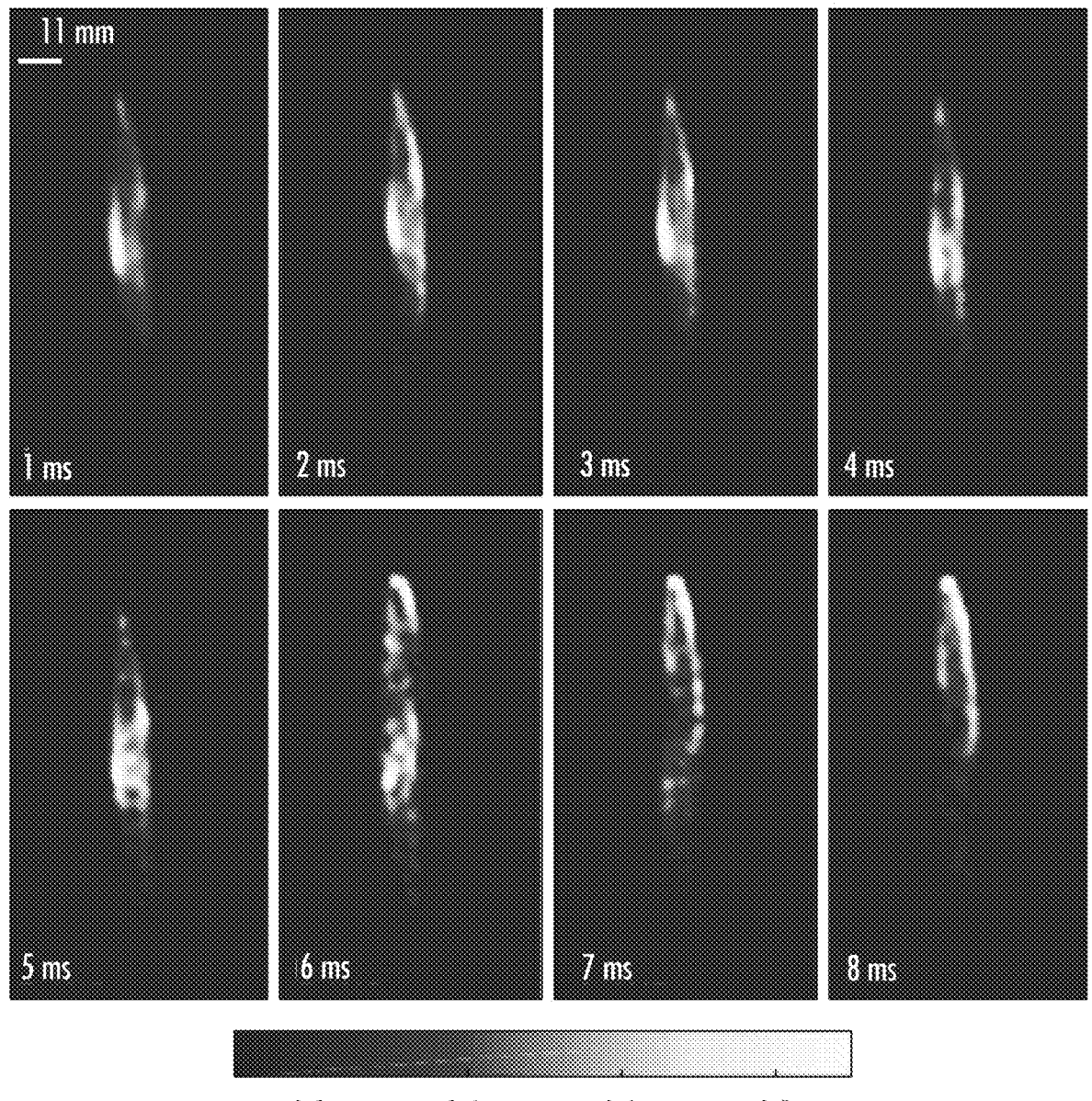
FIG. 12 shows recovered images of acoustically modulated methane diffusion flame chemiluminescence from FIG. 11. A filter radius of 10,000 rad/mm$^{-1}$ was used.

FIG. 12 shows the recovered sequential images of the oscillating flame from FIG. 11(a). It clearly shows that the flame is oscillating, i.e., as time lapses the flame chemiluminescence varies at different locations. Even the same intensities at the same location of the modulated image is shown in FIG. 11(a). The demultiplexing process can successfully separate and recover various images at 1 kHz.

For both FIG. 10 and FIG. 12, recovered images of 5-8 ms have worse SNR than the ones of 1-4 ms. The fundamental reason for the reduced SNR at higher time is the reduced sensitivity of the camera on higher spatial frequencies. Measurements of 5-8 ms are obtained in the outer ring in the Fourier domain as shown in FIG. 9 and FIG. 11, which means higher spatial frequencies or finer spatial resolutions are needed.

5. Conclusions

In summary, time multiplexed structured detection (TMSD) is demonstrated for high-speed flame chemiluminescence measurements in the flames. from a single snapshot. TMSD sheers the time lapse into the spatial frequency shifts, which allows multiple high-speed images to be frequency upshifted into distinct spatial frequency regions from the original image. A cumulative exposure captured in a single snapshot image contains distinct time evolution. Each distinct image is demultiplexed by hyperdyne mixing with the modulation frequency. TMSD is an optical frequency domain analog to carrier frequency modulation in radio and microwave detections.

Based on the current study, the TMSD has the following representative key properties:
(1) The fundamental principle is to sheer the time lapse into the spatial frequency domain. Thus, a cumulative exposure can be captured in a single image, i.e., shifting the multiple exposures to various locations in the spatial frequency domain, shown in FIG. 1. Demultiplexing in the post processing is achieved by homodyne mixing and low-pass filtering, shown in FIG. 4.
(2) The maximum multiplexing, i.e., maximum number of frames with maximum spatial resolutions, is obtained by fully occupying the frequency domain with hexagonal frequency shifts. It is corresponding to modulate the illumination pattern with varying angles and cycle periods to fill the whole frequency domain up to the diffraction limit circle in FIG. 2.
(3) The spatial resolution of time-multiplexing images is reduced and controlled by the low-pass filter, i.e., the size of the red circle in FIG. 4(b). It is inherently determined by the uncertainty principle of Fourier transformation, $\Delta f_x \cdot x \geq 1$. It is critical to design proper multiplexing patterns to obtain proper spatial resolutions in fluid measurements, which will be filtered and processed to obtain turbulence statistics of strain rate and Reynold shear stress etc. for model development and validations.
(4) Since most of the info in the aerodynamic images are located at the low spatial frequency regime as shown in FIG. 4(b), low-pass filter only slightly reduces the spatial resolutions. The features in the time-multiplexing images can be controlled by choosing modulation patterns and cutoff frequency of the low-pass filtering.

Furthermore, using a DMD to generate the modulation patterns at a higher rate (commercially available up to 40 kHz), one can achieve high-speed imaging with essentially any camera in theory. Our application of the SD technique to imaging flame chemiluminescence shows that this technique has potential for applications of high-speed combustion imaging and spectroscopy if used in combination with an intensified camera.

REFERENCES

1. C. D. Carter, S. Hammack, and T. Lee, "High-speed planar laser-induced fluorescence of the CH radical using the $C^2\Sigma^+ {-} X^2\Pi \left( \{0, 0\} \right)$ $C\ 2\Sigma+{-}X\ 2\Pi 0, 0$ band," Applied Physics B 116, 515-519 (2014).

2. P. P. Wu and R. B. Miles, "High-energy pulse-burst laser system for megahertz-rate flow visualization," Optics Letters 25, 1639-1641 (2000).
3. J. D. Miller, M. N. Slipchenko, J. G. Mance, S. Roy, and J. R. Gord, "1-kHz two-dimensional coherent anti-Stokes Raman scattering (2D-CARS) for gas-phase thermometry," Opt. Express 24, 24971-24979 (2016).
4. A. Bohlin and C. J. Kliewer, "Communication: Two-dimensional gas-phase coherent anti-Stokes Raman spectroscopy (2D-CARS): Simultaneous planar imaging and multiplex spectroscopy in a single laser shot," The Journal of Chemical Physics 138, 221101 (2013).
5. N. Jiang, P. S. Hsu, J. G. Mance, Y. Wu, M. Gragston, Z. Zhang, J. D. Miller, J. R. Gord, and S. Roy, "High-speed 2D Raman imaging at elevated pressures," Optics Letters 42, 3678-3681 (2017).
6. Z. Wang, P. Stamatoglou, Z. Li, M. Alden, and M. Richter, "Ultra-high-speed PLIF imaging for simultaneous visualization of multiple species in turbulent flames," Opt. Express 25, 30214-30228 (2017).
7. M. G. L. Gustafsson, "Surpassing the lateral resolution limit by a factor of two using structured illumination microscopy," Journal of Microscopy 198, 82-87 (2000).
8. L. Schermelleh, R. Heintzmann, and H. Leonhardt, "A guide to super-resolution fluorescence microscopy," The Journal of Cell Biology 190, 165-175 (2010).
9. R. Heintzmann and C. G. Cremer, "Laterally modulated excitation microscopy: improvement of resolution by using a diffraction grating," in BiOS Europe '98, (SPIE, 1999), 12.
10. J. W. Goodman, Introduction to Fourier optics (Roberts and Company Publishers, 2005).
11. E. Kristensson, Z. Li, E. Berrocal, M. Richter, and M. Alden, "Instantaneous 3D imaging of flame species using coded laser illumination," Proceedings of the Combustion Institute 36, 4585-4591 (2017).
12. E. Kristensson, E. Berrocal, and M. Alden, "Two-pulse structured illumination imaging," Opt. Lett. 39, 2584-2587 (2014).
13. S. R. Khan, M. Feldman, and B. K. Gunturk, "Extracting sub-exposure images from a single capture through Fourier-based optical modulation," Signal Processing: Image Communication 60, 107-115 (2018).
14. Z. Zhang, M. N. Shneider, and R. B. Miles, "Coherent microwave rayleigh scattering from resonance-enhanced multiphoton ionization in argon," Physical Review Letters 98,—(2007).
15. Y. Wu, J. C. Sawyer, L. Su, and Z. Zhang, "Quantitative measurement of electron number in nanosecond and picosecond laser-induced air breakdown," Journal of Applied Physics 119, 173303 (2016).
16. P. S. Hsu, M. Gragston, Y. Wu, Z. Zhang, A. K. Patnaik, J. Kiefer, S. Roy, and J. R. Gord, "Sensitivity, stability, and precision of quantitative Ns-LIBS-based fuel-air-ratio measurements for methane-air flames at 1-11 bar," Applied Optics 55, 8042-8048 (2016).
17. Z. Zhang, M. N. Shneider, and R. B. Miles, "Microwave diagnostics of laser-induced avalanche ionization in air," Journal of Applied Physics 100, 6 (2006).
18. A. V. Oppenheim, A. S. Willsky, and S. H. Nawab, Signals & Systems, Prentice-Hall signal processing series (Prentice-Hall International, 1997).
19. T. C. Hales, "The Honeycomb Conjecture," Discrete & Computational Geometry 25, 1-22 (2001).
20. K. Dorozynska and E. Kristensson, "Implementation of a multiplexed structured illumination method to achieve snapshot multispectral imaging," Optics Express 25, 17211-17226 (2017).
21. G. Bub, M. Tecza, M. Helmes, P. Lee, and P. Kohl, "Temporal pixel multiplexing for simultaneous high-speed, high-resolution imaging," Nature methods 7, 209-211 (2010).
22. E. Hecht, Optics (Addison-Wesley, 2002).
23. K. Lee, K. Kim, G. Kim, S. Shin, and Y. Park, "Time-multiplexed structured illumination using a DMD for optical diffraction tomography," Opt. Lett. 42, 999-1002 (2017).
24. J. O'Connor, V. Acharya, and T. Lieuwen, "Transverse combustion instabilities: Acoustic, fluid mechanic, and flame processes," Progress in Energy and Combustion Science 49, 1-39 (2015).
25. K. Mohri, S. Görs, J. Schöler, A. Rittler, T. Dreier, C. Schulz, and A. Kempf, "Instantaneous 3D imaging of highly turbulent flames using computed tomography of chemiluminescence," Applied Optics 56, 7385-7395 (2017).

Section II—Single-Shot Nanosecond-Resolution Multi-frame Passive Imaging by Multiplexed Structured Image Capture 1. Introduction Passive imaging at nanoseconds or less exposure time has many scientific and engineering applications, including laser-material interactions, femtosecond filament, high harmonic generations, ultrafast chemistry, and air lasing [1]. Current complementary metal-oxide semiconductor (CMOS) and charge-coupled device (CCD) imaging devices cannot reach this speed due to limited on-chip storage capacity and electronic readout speeds, although in theory silicon can reach sub-nanosecond speed [2, 3]. Various optical gating and pump-probe approaches, such as ultrashort pulse interference [4], the Kerr electro-optic effect for ballistic imaging [5, 6], can capture only a single image. Temporal scanning, i.e., repetitive measurements with a varied delay between the pump and probe or between laser pulse and camera gate can be used [7], but are significantly limited the applications to repetitive events, and therefore, only provide statistical measurements. Recent demonstrations of passive imaging methods utilize compressed sensing to recover ultrafast images from a streak camera or temporal pixel multiplexing [8], which is different from the current approach [9, 10]. Others have utilized spatial modulation of the light source for boosting imaging speeds and storing multiple images in a single frame [11]. Modulation of light just prior to collection for boosting imaging speeds has also been demonstrated [12, 13]. A recent review [14] explores in detail a variety of novel ultra-fast single-shot imaging techniques.

In the present work, a detailed study of single-shot, passive imaging with temporal resolution at the nanosecond level is presented using a unique high-speed computational imaging method, namely MUltiplexed Structured Image Capture (MUSIC). As a passive imaging method, MUSIC encodes the temporal evolution of the scenes in a single snapshot into spatial frequency shifts; thus, producing multiplexed images. These multiplexed images contain image information from several points in time, which can be separated computationally. Furthermore, MUSIC can essentially bypass the speed limits of electronic and/or mechanical shutters in the high-speed cameras since the encoding is done optically. In this current form of MUSIC, modulation patterns are applied just before imaging. Sub-exposure 2D images corresponding to the optical flight time of nanoseconds are demultiplexed and extracted, revealing nanosecond evolution of the 2D scene in the post processing. In theory, the MUSIC method might extend the single-shot passive imaging up to femtoseconds, which will provide an alternate approach for ultrafast passive imaging and unprecedented insights on ultrafast physics and chemistry. Theoretical limitations on maximum multiplexed patterns are discussed as combinations of diffraction limits and spatial resolutions of the recovered images.

Laser-induced ionization and plasma is used as an imaging target. It has been widely used for various applications ranging from basic scientific laboratories to space exploration, including femtosecond filament [15], high harmonic generation [16], air lasing [17], Laser-induced Breakdown Spectroscopy (LIBS) [18-20], laser-induced ignition [21] and etc. Laser plasma generation begins with the creation of seed electrons from multiphoton ionization and/or Keldysh tunneling ionization processes near the laser focal position by the front end of the high-intensity pulse, with the latter mechanism only becoming applicable for very high intensities. For the ns-pulse used in this work, non-resonant multiphoton ionization is the seed electron generation mode. The seed electrons absorb a large percentage of the remaining laser pulse and are accelerated by the laser's electromagnetic field via the inverse-bremsstrahlung effect. With a sufficient optical field applied, the electrons are accelerated to energies sufficient for electron impact ionization upon collisions with the neutral gas atoms and molecules. The newly liberated electrons are then accelerated by the field leading to an electron avalanche ionization process during the laser pulse in nanoseconds [22, 23]. The development of the laser plasma is a very dynamic process, and plasma parameters can change drastically within a nanosecond considering that electron collisions are on the order of tens of picoseconds. Therefore, the LIBS plasma is used as a target for high-speed imaging.

2. Experiment Setup

2.1 Three-Channel Multiplexed Structured Image Capture (MUSIC) System

A variable zoom camera lens was used to relay the plasma emissions. The first beam splitter (30% transmission, 70% reflection) was used to separate the images into the path one, path two, and path three. The image was further split by the second beam splitter (50% transmissions, 50% reflection) into path two and three. The plasma image was projected onto three Ronchi rulings (10 grooves per millimeter) along three optical paths. The modulated images were merged by a beam combiner cube before being collected by a gated Intensified CCD camera (Princeton Instruments, PI Max 4). The optical paths along three channels are 10 cm, 40 cm, and 70 cm, respectively, which corresponds to 1 ns of delay for path two and 2 ns of delay for path three relative to the path one. The number of channels can be expanded as needed to extend more simultaneous imaging. The MUSIC system, as an ultrafast imaging system, can be used for single-shot nanosecond resolution or higher imaging and measurements of laser-induced plasma generation and visualization and tracking of fast objects.

2.2 Coherent Microwave Scattering System

A 10-dBm tunable microwave source (HP 8350B sweep oscillator, set at ~10 GHz) was split into two channels.[22, 24] One of the channels was used to illuminate the plasma by employing a microwave horn (WR75, 15-dB gain). The backscattering is monitored through a homodyne transceiver detection system. The scattering from the plasma is collected by the same microwave horn. The signal passes through a microwave circulator and is amplified 30 dB by one preamplifier at ~10 GHz. After the frequency is down-converted with by mixing with the second channel, two other amplifiers with bandwidth in the range 2.5 kHz-500 MHz amplifies the signal 60 dB. Considering the geometry of dipole radiation of microwave, the polarization of the microwave is chosen to be along the propagation direction of the laser beam, maximizing the scattering signal. The coherent microwave scattering system can be used to monitor the generation and evolution of electrons in the laser-induced plasma region with a temporal resolution of ~3 ns.

2.3 Imaging Target 532 nm laser radiation from an Nd:YAG laser (Continuum Surelite) operating with a nominal 8 ns pulse width at 10 Hz repetition rate was focused with a 50 mm plano convex lens into a 20 μm spot, yielding the peak intensity of ~$10^{12}$ W/cm². Coherent microwave scattering and MUSIC were used to simultaneously characterize the laser-induced ionization in air, as shown by the experiment setup in FIG. 13A. Microwave scattering can measure the total electron number evolution with a temporal resolution of ~3 nanoseconds (ns). Note that plasma expansion leads to a critical electron number density beyond the microwave penetration depth, which causes the microwave signal to decrease after peak [22].

Figure 13A:
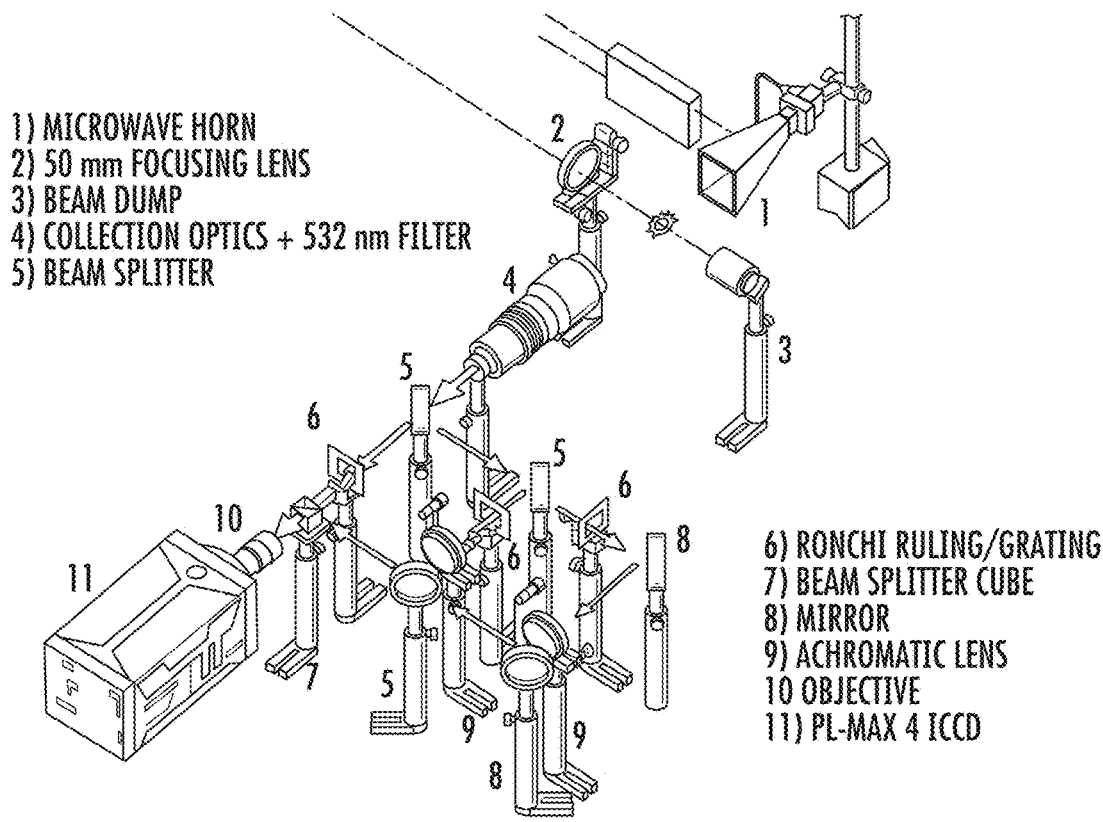
FIG. 13A shows schematics of the experiment setup for simultaneous measurements of laser-induced avalanche ionization by coherent microwave scattering and three-channel MUSIC.
Figure 13B:
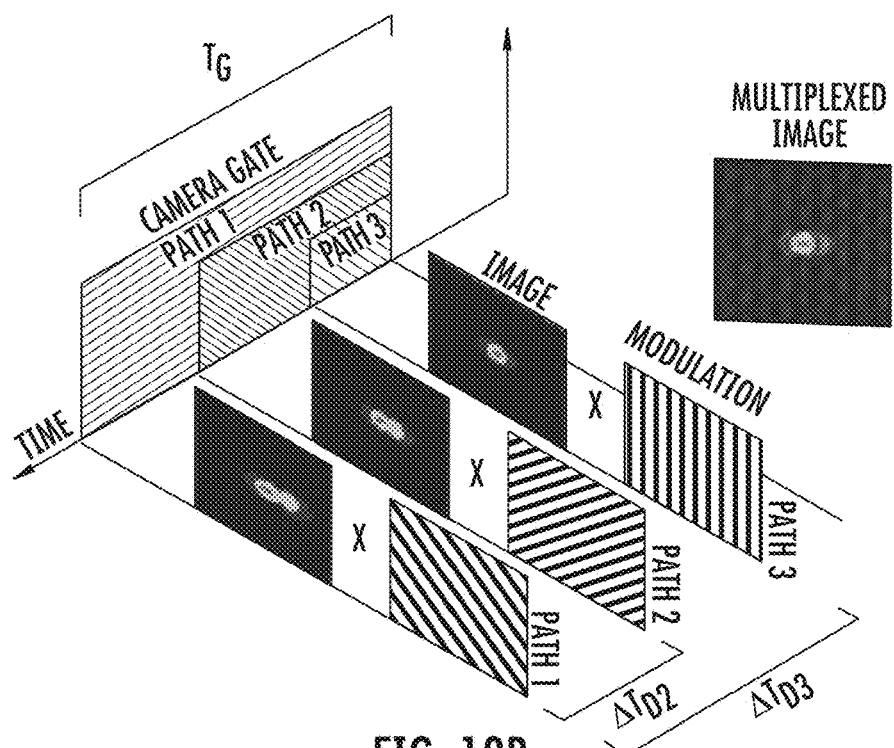
FIG. 13B is a timing diagram for nanosecond-resolution MUSIC at three individual channels. Each path is modulated with unique patterns by Ronchi rulings (component 6 in FIG. 13A). The time of flight along each path is distinct so that time-multiplexed images from the plasma can be captured into a single snapshot, shown on the top. The time axis shows how much of the event information was captured in each channel. Note that path 3 contributes information from the earliest times only.

A variable zoom camera lens was used to relay the plasma emissions into the three-channel MUSIC apparatus, as shown in FIG. 13A. The MUSIC apparatus for this work consists of two parts, the optical delay circuits and the spatial modulation component in each delay circuit. Beam splitters and mirrors allow for plasma emissions to travel three different paths, each of which encodes the image with a different spatial modulation pattern. An intensified camera (Princeton Instruments PIMax 4) with a gate width of 3 ns was used to collect the combined images out of the MUSIC apparatus. Note that the gated camera can only collect light over a time equal to the gate width, $T_G$. The information from path one was modulated and sent to the camera after the beam splitter and contributes image information during the entire gate width. The same image was then split and modulated repeatedly, each time causing a delay relative to the start of the camera exposure gate, as shown in FIG. 13B. Thus, the delayed modulated images arrived later at the camera due to time of flight differences. Since images from each path were modulated differently, each image can be individually demultiplexed and recovered. Furthermore, since each image contained the same information but was imaged for different exposure times, delayed images represent earlier time information in accordance with FIG. 13B.

It should be noted that the current configuration uses beamsplitters and optical delays to gain the temporal resolutions among multiplexed images. The advantages are the simplicity in the experimental setup: optical delays can be on the order of picoseconds or femtoseconds for higher temporal resolutions. While it leads to a reduced optical efficiency for adding more channels.

3. Results

3.1 Imaging Model

The multiplexed image intensity, $I_{CAM}$, collected by the camera in multiple channels is $$I_G(\vec{r},t)=\sum_{n=1}^{3}W(t)I_n(\vec{r},t-\Delta t_{Dn})M_n(\vec{r})\varepsilon_n \qquad (1)$$

where $\Delta t_{Dn}=t_{Dn}-t_{D1}$ is the time delay that has traveled path n relative to path one and $I_n$ is the image intensity traveling along path, $$I_n\left(\vec{r}, t - \Delta t_{Dn}\right) = \begin{cases} 0 & t < \Delta t_{Dn} \\ I(\vec{r}, t) & t \geq \Delta t_{Dn} \end{cases} \qquad (2)$$

Here, $I(\vec{r}, t)$ is the image intensity, $M_n(\vec{r})$ is the spatial modulation mask for path n, and $\varepsilon_n$ is the optical efficiency of path n. Imaging with a gated camera can be modeled as windowing in the time domain, integrating (i.e. summing) image intensity over the window, and sampling in the spatial domain, with the spatial sampling determined by the pixel layout and size. The windowing function is a square pulse centered at time $t_0$ with width $T_G$, $$W(t) = \prod\left(\frac{t-t_0}{T_G}\right) = \begin{cases} 0 & |t| > \frac{1}{2} \\ \frac{1}{2} & |t| = \frac{1}{2} \\ 1 & |t| < \frac{1}{2} \end{cases} \qquad (3)$$

and $t_0=T_{GD}+T_G/2$, with $T_{GD}$ denoting the gate delay time.

Each term in the sum in Eq. (1) represents image information that has traveled at a different path. Since the camera gate is finite in time, information delayed by traveling different paths is sliced and shortened by the gate, effectively giving the delayed information shorter gate times, i.e., time of flight acquisition. The spatial modulation resulting from applying a unique mask $M_n(\vec{r})$ to each path, which is multiplication of the images with the masks in the spatial domain, is equivalent to the convolution of the images and masks in the spatial frequency domain. The Ronchi rulings used in this work to apply the modulation patterns are modeled as periodic square waves with spatially frequency $k_0$.

In the spatial frequency domain, the multiplexed image can be shown as, $$\tilde{I}_G(\vec{k}, t) = \qquad (4)$$
$$\prod\left(\frac{t-t_0}{T_G}\right)\sum_{n=1}^{3}\left[\varepsilon_n I_n(\vec{k}, t - \Delta t_{Dn}) \otimes \sum_{m=-\infty}^{\infty}\frac{2\sin(mk_0 T_1)}{m}\delta(k'_{xn} - mk_0)\right]$$

Here "$\otimes$" denotes the convolution operator, where the right-hand side comes from the Fourier transform of the Ronchi ruling pattern, and $k_{xn}'=k_x \cos\theta_n+k_y \sin\theta_n$. Rotation of the Ronchi ruling by angle $\theta_n$ rotates the Fourier transform of the mask by the same amount, which is a sinc function.

Figure 14A:
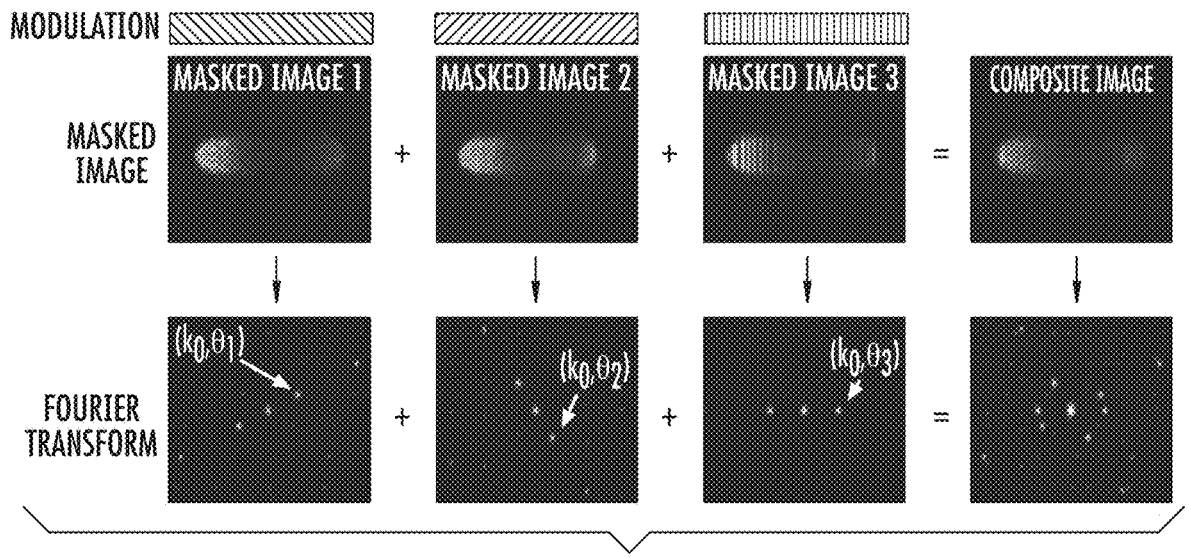
FIG. 14A shows phantoms of multiplexing of plasma emission by various spatial frequency modulations are shown as individual modulated images as Masked Image 1, 2, and 3 and the resulting multiplexed composite image. Each of the three images has a mask applied to it via multiplication and is summed into a composite multiplexed image, which represents the image stored by the camera during the gate time. The Fourier transform of each image is shown underneath, specifically showing that the Fourier transform of the composite image is equivalent to summing the Fourier transforms of each individual image. Arrows indicate the first harmonic of the sinc function.

Images through each path contribute a unique shifted spatial frequency throughout the gate time $T_G$ due to $k_{xn}'$ being different, which is shown in FIG. 14A. It implies that due to the Dirac delta function in Eq. (4), each harmonic of the sinc function in the spatial frequency domain of the masked image contains a copy of the image of the Fourier transform of the pre-masked image. Therefore, most of the image information is uniquely preserved in the in higher harmonics shown in FIG. 14A, and by using Ronchi rulings with different rotations for each path, this information can be kept separate in the final composite image even if there is significant image overlap. Note that the center of the Fourier domain represents unshifted DC components of the information, and therefore contains information from all three paths.

3.2 Computational Image Recovery

The fundamental principle of MUSIC in this application is to encode the time lapse into the spatial frequency domain, thereby allowing a single, cumulative exposure to be captured that contains multiple individual images (the maximum number of images than can be stored is discussed later in this work). The encoded images are then recovered through selective filtering in the frequency domain. The spatial resolution of the multiplexed images is reduced and dependent on the bandwidth of the low-pass filter used during recovery. It is inherently determined by the uncertainty principle of Fourier transformation, i.e., $\Delta f_r \cdot \Delta r \geq 1$. Furthermore, it should be noted that the spatial frequencies of most images lie within low frequency ranges as discussed in compressed sensing techniques [25]. A loss of <5% of high spatial frequency components is generally used as the criterion for recovery.

Figure 14B:
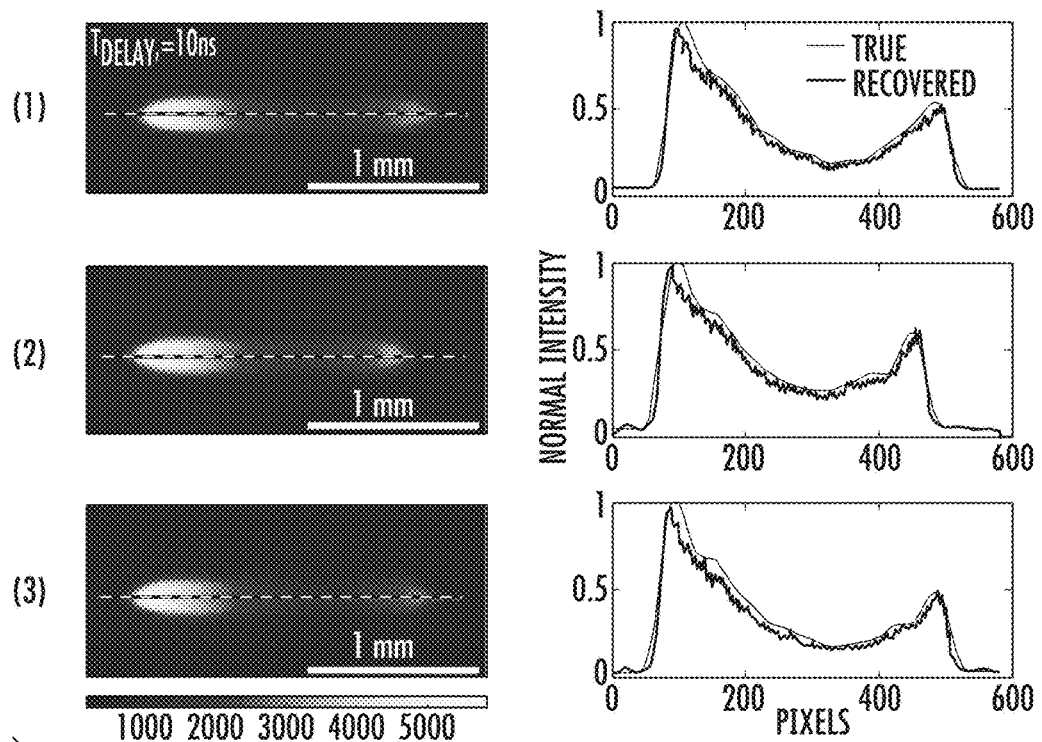
FIG. 14B shows computational images recovered from the composite image in FIG. 14A and a line profile comparison to the true image before applications of masks.

Computational image recovery on the phantoms of multiplexed plasma emissions was conducted. A two-step recovery was used: first shifting the corresponding harmonic back to the center of the spatial frequency domain was to remove the modulation patterns from the multiplexed images and then applying a low-pass filter around the center region was to recover individual images, which is similar to methodology used for structured illumination technique [12]. The size of the filter determines the resolution, since any spatial information outside the filter is lost; however, the filter size must also be small enough to prevent interference from other harmonics in the Fourier domain. FIG. 14B shows the recovered images from the composite image in FIG. 14A. Comparisons of line profiles from original phantom with the ones from the recovered images show very good agreement.

3.3 Experimental Image Recovery

Figure 15C:
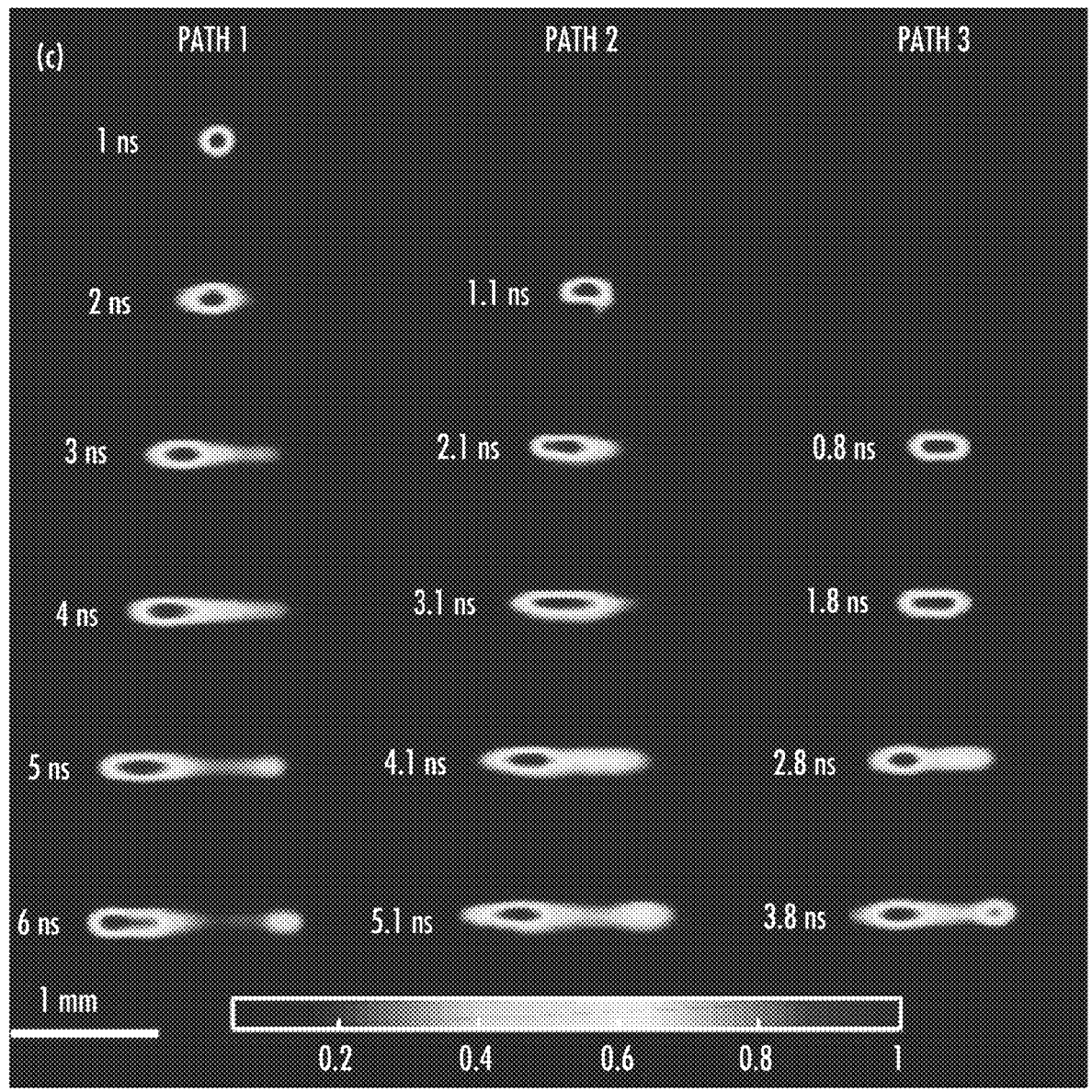
FIG. 15C shows recovered images of laser-induced plasma using MUSIC. Note that each row is a single shot. Path one, two, and three have effective camera gate widths of 3.0 ns, 2.1 ns, and 0.8 ns respectively. Laser power was 60 mJ/pulse with an 8 ns pulse width and repetition rate of 10 Hz. A 50 mm focusing lens was used to generate the plasma.

Experimental demonstration of single-shot nanosecond-resolution imaging of laser-induced plasma was conducted, as shown in FIG. 13A. The optical paths from the first beam splitter to the beam combiner are 10 cm, 40 cm, and 70 cm for path one, two and three, respectively. It leads to the difference of time of flight are 1.2 ns for path two and 2.8 ns for path three, compared to path one, i.e., achieving ~1 nanosecond temporal resolution between measurements. FIG. 15A shows an example of a single-shot multiplexed image of the plasma emission by the three-channel MUSIC system with laser energy of ~60 mJ/pulse, camera gate delay of 4.0 ns after the laser pulse, and camera gate width of 3.0 ns. The corresponding Fourier transformation in FIG. 15B, demonstrates that each path has contributed information to the multiplexed image in a similar manner to phantoms in FIG. 2(b). Depending on relative image intensities from various paths, the higher-harmonics, which result from the square wave modulation by the Ronchi ruling, are shown and well-separated in the Fourier domain.

FIG. 15B shows a group of recovered images, three per laser shot, of the laser-induced plasma by different laser pulses. Images from each row were recovered from the same laser shot and captured within a single camera gate of 3.0 ns.

On the first row, the plasma appeared in path one first as the camera gate starts at 2.0 ns ahead of the laser pulse. Significant ionization occurred in the last nanosecond of the gate. Subsequently on the second row, the plasma emissions showed on path one and two, as the camera gate started at 1.0 ns ahead of the laser. The rest of the images showed the sequential move of the camera gate by 1.0 ns on each row. Single-shot imaging of laser-induced plasma emissions was obtained at ~1 nanosecond. It should be noted that reduction of optical delay paths can lead to even faster imaging of the plasma, thus the MUSIC method is only limited by the number of modulation patterns and available photons for imaging. For example, a delay of hundreds of microns would produce ultrafast imaging at petahertz. The recovery of the multiplexed images will need to be subtracted to remove the temporal overlaps.

3.4 Comparisons with Coherent Microwave Scattering and Plasma Modeling

To get insight into the physics of laser-induced ionization and the time scales associated with its evolution, comparisons of the MUSIC measurements with coherent microwave scattering and numerical simulations solving the Boltzmann kinetic equation for the electron energy distribution function (EEDF) were conducted. Emissions from laser-induced plasmas are initially broadband continuum as inverse bremsstrahlung and free-free transitions. The emissions become distinct atomic emission lines after the plasma cools down at 20-30 ns [22]. Coherent microwave scattering tracks total electron number in the plasma and is proportional to the total plasma emissions in the avalanche phase of the plasma generation. It should be noted that our emphasis here is a qualitative comparison of microwave scattering, MUSIC and plasma modeling to confirm temporal evolution of the plasma.

The plasma kinetic model is based on a non-stationary kinetic equation under Lorentz approximation and includes effects of collisional electron heating by the laser field, generation of new electrons in the process of optical field ionization (OFI) from the ground and electronically excited molecular states, elastic scattering of electrons on $N_2$ and $O_2$ molecules in air, inelastic processes of electron impact excitations of the $A^3\Sigma_u$, $B^3\Pi_g$, $a^1\Sigma_u$, $a^1\Pi_g$, $C^3\Pi_u$ electronic states in molecular nitrogen, vibrational excitation in $N_2$ and $O_2$ molecules, and electron impact ionization from the ground and excited electronic states. The calculated EEDF provides reaction rates for the coupled set of balance equations for the densities of electrons, neutral, and ionic and electronically excited molecular and atomic species. The OFI source of electrons is described using Popov-Perelomov-Terent'ev (PPT) strong field ionization model [26] in the form suggested in [27] and the photoelectron energy distribution function derived in [28]. The calculations start 3 ns before the maximum of the laser pulse when the OFI generated electron density reaches $10^{10}$ cm$^{-3}$. The plasma density predicted by the simulations reaches the value $\approx 6 \cdot 10^{17}$ cm$^{-3}$ which is in a very good agreement with the value $\approx 7.5 \cdot 10^{17}$ cm$^{-3}$ retrieved from the coherent microwave scattering measurements [23].

Figure 16:
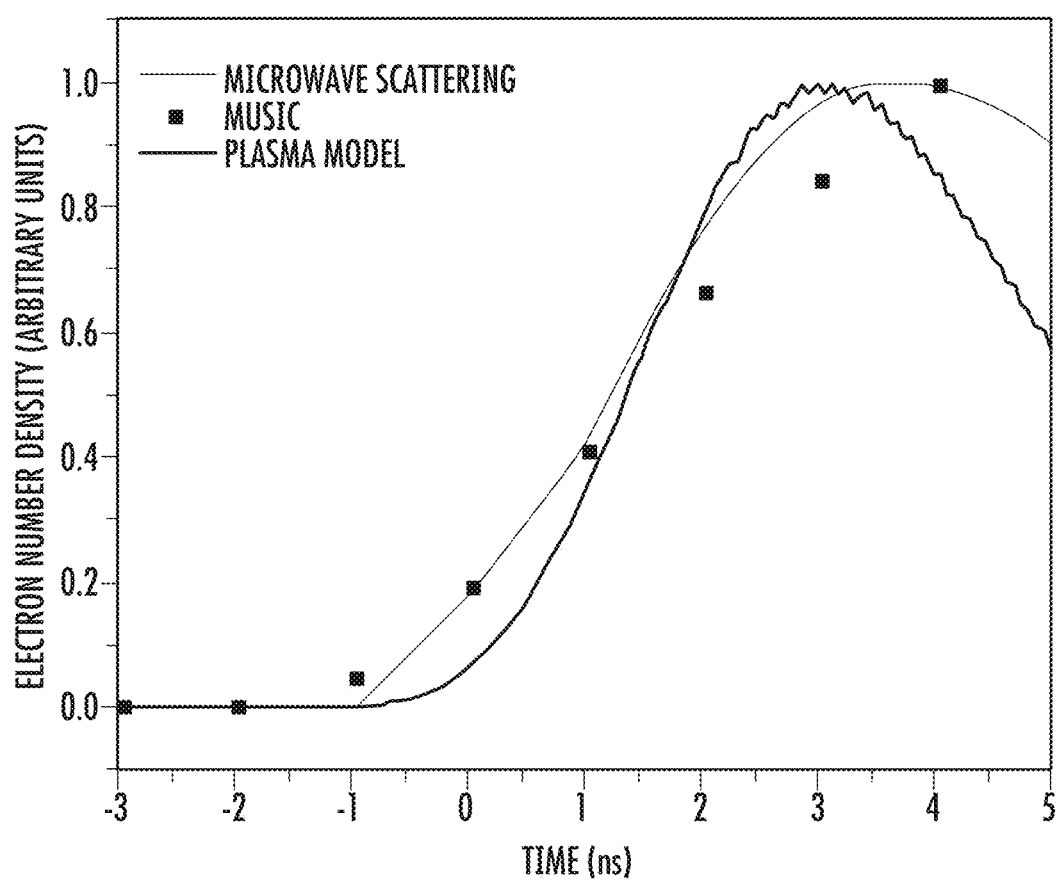
FIG. 16 is a chart showing a comparison of total image intensity of recovered images to microwave scattering and plasma modeling of the laser-induced plasma. The red solid line shows a convolution of the kinetic simulation results with the response function of the microwave diagnostic.
Figure 17:
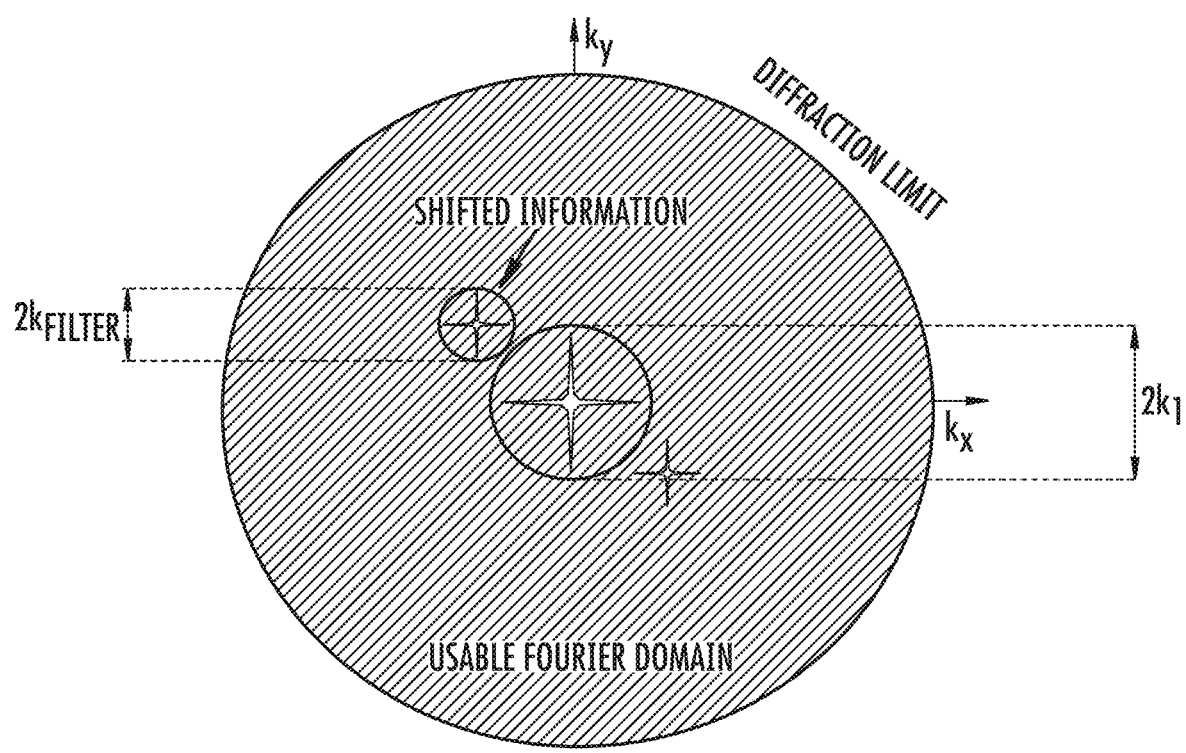
FIG. 17 illustrates that the ultimate boundary is the spatial frequency associated diffraction limit of the system. However, low frequency information common to all images regardless of modulation (i.e. the fundamental harmonic) must be avoided too. Therefore, the space available to store the modulated image data is an annulus.

FIG. 16 shows a comparison of the MUSIC measurements with the coherent microwave scattering and the simulated evolution of the plasma electron density. The results are normalized to show the overall temporal evolution only, since the plasma emissions from MUSIC measurements are proportional to total electron number without absolute calibration. Additionally, it should be noted that measured values are the result convoluted with an instrument function having a temporal resolution ~1 ns, which leads to the discrepancies at the initial phase of the ionization.

4. Discussion: Maximum Number of Multiplexing Patterns and Resolution Limitations There is a theoretical limit for multiplexing single exposure, which is determined by the desired spatial resolution and imaging system diffraction limits. The maximum multiplexing is determined by first considering the maximum resolution desired for each recovered image, which has a corresponding spatial frequency, $k_{filter}$. This $k_{filter}$ is used as the filter radius in the Fourier domain during image recovery. Furthermore, note that the only space available in the Fourier domain to shift image information to is the annulus defined between $k_f$, a spatial frequency cutoff of the common fundamental harmonic, and $k_{diff}$, the spatial frequency corresponding to the diffraction limit. Then an upper bound on the number of patterns that can be used in the multiplexing, $N_u$, is the ratio the area of the annulus, $A_{Annulus}$, in the Fourier domain to the area of the filter, $A_{Filter}$.

$$A_{Filter} = \pi k_{filter}^2 \quad (5)$$

In the spatial frequency domain (i.e., Fourier domain), the usable region for multiplexing can be expressed as $$A_{Annulus} = \pi [k_{diff}^2 - k_I^2] \quad (6)$$

Therefore, an upper bound on the number of patterns than can be used is the ratio of the area of the annulus to the area of the filter (which represents how many none overlapping circles can be fit in the annulus:

$$2N \leq \frac{A_{Annulus}}{A_{Filter}} = \frac{k_{diff}^2 - k_I^2}{k_{filter}^2} \quad (7)$$

The factor of two is due to the symmetry of the Fourier domain; specifically, the copying of information to both positive and negative frequency locations for a given modulation. Furthermore, this is an upper bound since it includes the gaps between the filling circles in the calculation. Hence, $$\frac{2N}{k_{diff}^2 - k_I^2} \leq \frac{1}{k_{filter}^2} \quad (8)$$

The resolution of the recovered image is determined by the size of the filter, due to the exclusion of high frequency image information outside of the filter region. Since, $k_{filter}^2 \propto D^{-2}$, where D is the smallest resolvable distance, then the limit on the resolution of the recovered image is:

$$D \geq \frac{\alpha N^{1/2}}{(k_{diff}^2 - k_I^2)^{1/2}} \quad (9)$$

where $\alpha$ is a constant. Hence, D will increase if the number of modulation patterns is increased, representing lower image quality for the recovered images. Furthermore, in order to decrease D, one must choose to use less patterns and larger filter radii.

5. Summary and Conclusions

Single-shot nanosecond-resolution multiframe passive imaging method, MUltiplexed Structured Imaging and Capture (MUSIC) was demonstrated to characterize avalanche ionization of laser-induced plasma in air. The MUSIC technique uses beamsplitters and optical delay lines to generate time evolution of a scene. On each beampath the image is uniquely coded by a Ronchi ruling, producing distinct spatial frequency shifts of the image in the spatial Fourier domain. The multiplexed images from individual beampaths are captured by a time-gated camera at a few nanoseconds. The final image, containing time evolution of the scene from each path, is demultiplexed in the after-processing to recover nanosecond-resolution images. The technique is used to monitor the temporal evolution of the avalanche ionization process in the laser-induced plasma in air. Comparisons with coherent microwave scattering measurements and plasma modeling yield good agreements.

The MUSIC technique as demonstrated here, is a passive imaging technique, which has the following representative characteristics:

1. The fundamental principle is to encode the time lapse into the spatial frequency domain using different spatial modulation patterns prior to arriving at the camera. Thus, a cumulative exposure can be captured in a single image, i.e., shifting the multiple exposures to various locations in the spatial frequency domain. Demultiplexing in the post-processing is achieved by homodyne mixing with the modulation pattern and low-pass filtering.
2. The spatial resolution of time-multiplexing images is reduced and controlled by the low-pass filter. It is inherently determined by the uncertainty principle of Fourier transformation, $\Delta f_r \cdot \Delta r \geq 1$.
3. The maximum multiplexing, i.e., maximum number of frames with maximum spatial resolutions, is obtained by fully occupying the frequency domain. It is corresponding to modulate the images with varying angles and cycle periods to fill the whole frequency domain up to the diffraction limit circle.

Overall, the ability to overlay multiple frames into a single image can be very beneficial in various applications where only a single camera is available (e.g. optical access restrictions). The MUSIC passive imaging technique can be useful for high temporal resolution applications in physics, chemistry and engineering.

REFERENCES

1. H. Mikami, L. Gao, and K. Goda, "Ultrafast optical imaging technology: principles and applications of emerging methods," in *Nanophotonics*(2016), p. 497.
2. T. G. Etoh, V. T. S. Dao, T. Yamada, and E. Charbon, "Toward One Giga Frames per Second—Evolution of in Situ Storage Image Sensors," Sensors (Basel, Switzerland) 13, 4640-4658 (2013).
3. T. G. Etoh, A. Q. Nguyen, Y. Kamakura, K. Shimonomura, T. Y. Le, and N. Mori, "The Theoretical Highest Frame Rate of Silicon Image Sensors," Sensors (Basel, Switzerland) 17, 483 (2017).
4. G. P. Wakeham, and K. A. Nelson, "Dual-echelon single-shot femtosecond spectroscopy," Opt. Lett. 25, 505-507 (2000).
5. M. Linne, M. Paciaroni, T. Hall, and T. Parker, "Ballistic imaging of the near field in a diesel spray," Experiments in Fluids 40, 836-846(2006).
6. S. P. Duran, J. M. Porter, and T. E. Parker, "Ballistic imaging of diesel sprays using a picosecond laser: characterization and demonstration," Appl. Opt. 54, 1743-1750 (2015).
7. A. Velten, D. Wu, B. Masia, A. Jarabo, C. Barsi, C. Joshi, E. Lawson, M. Bawendi, D. Gutierrez, and R. Raskar, "Imaging the propagation of light through scenes at picosecond resolution," Commun. ACM 59, 79-86 (2016).
8. G. Bub, M. Tecza, M. Helmes, P. Lee, and P. Kohl, "Temporal pixel multiplexing for simultaneous high-speed, high-resolution imaging," Nature Methods 7, 209 (2010).
9. J. Liang, L. Zhu, and L. V. Wang, "Single-shot real-time femtosecond imaging of temporal focusing," Light: Science & Applications 7, 42 (2018).
10. L. Gao, J. Liang, C. Li, and L. V. Wang, "Single-shot compressed ultrafast photography at one hundred billion frames per second," Nature 516, 74 (2014).
11. A. Ehn, J. Bood, Z. Li, E. Berrocal, M. Alden, and E. Kristensson, "FRAME: femtosecond videography for atomic and molecular dynamics," Light: Science &Amp; Applications 6, e17045 (2017).
12. M. Gragston, C. D. Smith, and Z. Zhang, "High-speed flame chemiluminescence imaging using time-multiplexed structured detection," Appl. Opt. 57, 2923-2929 (2018).
13. S. R. Khan, M. Feldman, and B. K. Gunturk, "Extracting sub-exposure images from a single capture through Fourier-based optical modulation," Signal Processing: Image Communication 60, 107-115 (2018).
14. J. Liang, and L. V. Wang, "Single-shot ultrafast optical imaging," Optica 5, 1113-1127 (2018).
15. A. Braun, G. Korn, X. Liu, D. Du, J. Squier, and G. Mourou, "Self-channeling of high-peak-power femtosecond laser pulses in air," Optics letters 20, 73-75 (1995).
16. B. Dromey, M. Zepf, A. Gopal, K. Lancaster, M. Wei, K. Krushelnick, M. Tatarakis, N. Vakakis, S. Moustaizis, and R. Kodama, "High harmonic generation in the relativistic limit," Nature physics 2, 456 (2006).
17. A. Dogariu, J. B. Michael, M. O. Scully, and R. B. Miles, "High-gain backward lasing in air," Science 331, 442-445 (2011).
18. M. B. Shattan, D. J. Miller, M. T. Cook, A. C. Stowe, J. D. Auxier, C. Parigger, and H. L. Hall, "Detection of uranyl fluoride and sand surface contamination on metal substrates by hand-held laser-induced breakdown spectroscopy," Appl. Opt. 56, 9868-9875 (2017).
19. B. Sallé, J. L. Lacour, P. Mauchien, P. Fichet, S. Maurice, and G. Manhés, "Comparative study of different methodologies for quantitative rock analysis by Laser-Induced Breakdown Spectroscopy in a simulated Martian atmosphere," Spectrochimica Acta Part B: Atomic Spectroscopy 61, 301-313 (2006).
20. P. S. Hsu, M. Gragston, Y. Wu, Z. Zhang, A. K. Patnaik, J. Kiefer, S. Roy, and J. R. Gord, "Sensitivity, stability, and precision of quantitative Ns-LIBS-based fuel-air-ratio measurements for methane-air flames at 1-11 bar," Appl. Opt. 55, 8042-8048 (2016).
21. P. S. Hsu, S. Roy, Z. Zhang, J. Sawyer, M. N. Slipchenko, J. G. Mance, and J. R. Gord, "High-repetition-rate laser ignition of fuel-air mixtures," Opt. Lett. 41, 1570-1573 (2016).
22. Y. Wu, J. C. Sawyer, L. Su, and Z. Zhang, "Quantitative measurement of electron number in nanosecond and picosecond laser-induced air breakdown," Journal of Applied Physics 119, 173303 (2016).

23. Z. Zhang, M. N. Shneider, and R. B. Miles, "Microwave diagnostics of laser-induced avalanche ionization in air," Journal of Applied Physics 100, 074912 (2006).
24. Z. Zhang, M. N. Shneider, and R. B. Miles, "Coherent microwave rayleigh scattering from resonance-enhanced multiphoton ionization in argon," Physical Review Letters 98,—(2007).
25. D. L. Donoho, "Compressed sensing," IEEE Transactions on Information Theory 52, 1289-1306 (2006).
26. A. Perelomov, and V. Popov, "Ionization of atoms in an alternating electric field," Sov. Phys. JETP 23, 924-934 (1966).
27. J. Schwarz, P. Rambo, M. Kimmel, and B. Atherton, "Measurement of nonlinear refractive index and ionization rates in air using a wavefront sensor," Opt. Express 20, 8791-8803 (2012).
28. V. D. Mur, S. V. Popruzhenko, and V. S. Popov, "Energy and momentum spectra of photoelectrons under conditions of ionization by strong laser radiation (The case of elliptic polarization)," Journal of Experimental and Theoretical Physics 92, 777-788 (2001).

Section III—Multiplexed Structured Image Capture for Single Exposure Field of View Increase In this work, Multiplexed Structured Image Capture (MUSIC) is introduced as an approach to increase the field of view during a single exposure. MUSIC works by applying a unique spatial modulation pattern to the light collected from different parts of the scene. This work demonstrates two unique setups for collecting light from different parts of the scene, a single lens configuration and a dual lens configuration. Post-processing of the modulated images allows for the two scenes to be easily separated using a Fourier analysis of the captured image. We demonstrate MUSIC for still scene, schlieren, and flame chemiluminescence imaging to increase the field of view. Though we demonstrate only two scene imaging, more scenes can be added by using extra patterns and extending the optical setup.

1. Introduction

Imaging remains one of the most important and reliable means of measurement in aerospace and combustion science. Schlieren imaging, developed in 1864, is still used today for visualization of fluid flow in even the most modern wind-tunnel experiments [1-3]. PLIF [4], 2D Raman scattering [5, 6], and chemiluminescence [4, 7] imaging techniques are essential for combustion diagnostics; providing information about local species concentration, geometry, and more. Modern tomographic measurements for combustion processes are an example of the high-quality information that can be gained from imaging [8, 9]. Often however, a reduction in the field of view occurs when imaging with high-speed cameras due to reducing the on-camera region of interest to account for limitations on electronic read-out times. Furthermore, multiple cameras are sometimes needed for imaging of larger objects. Thus, more spatial information from a single measurement would be beneficial for capturing dynamics on a larger scale.

Figure 18A:
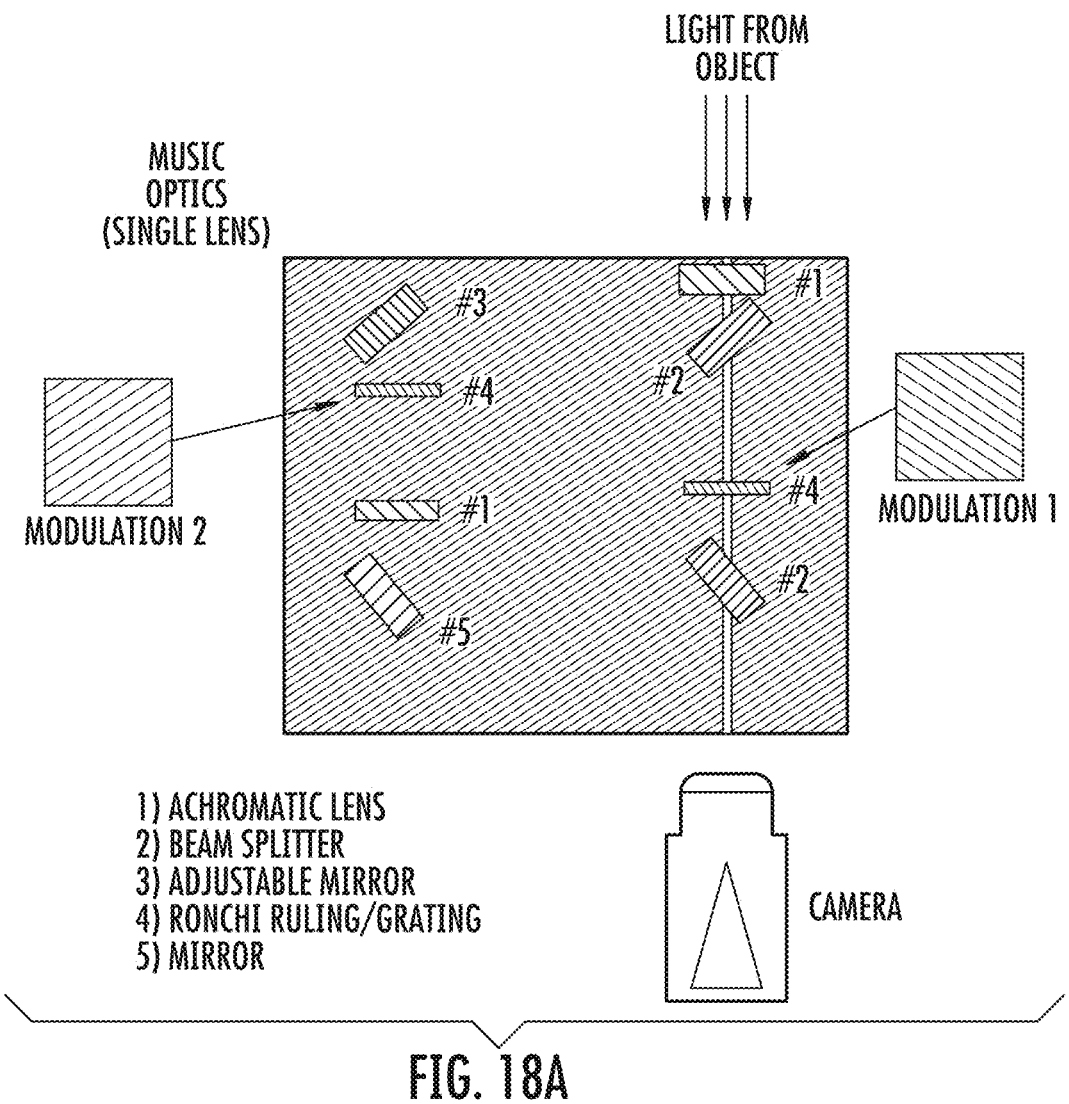
FIG. 18A shows a single lens version of a multiplexing system for field of view extension. Light collected by an achromatic lens is split into two paths, with each path viewing a different part of the scene. Ronchi rulings/gratings are placed on each path to provide unique modulations of the images. Note that modulation occurs when focusing the image onto the Ronchi ruling. The modulated images are then simultaneously recorded by a camera focused to each of the Ronchi rulings through a beam splitter.
Figure 18B:
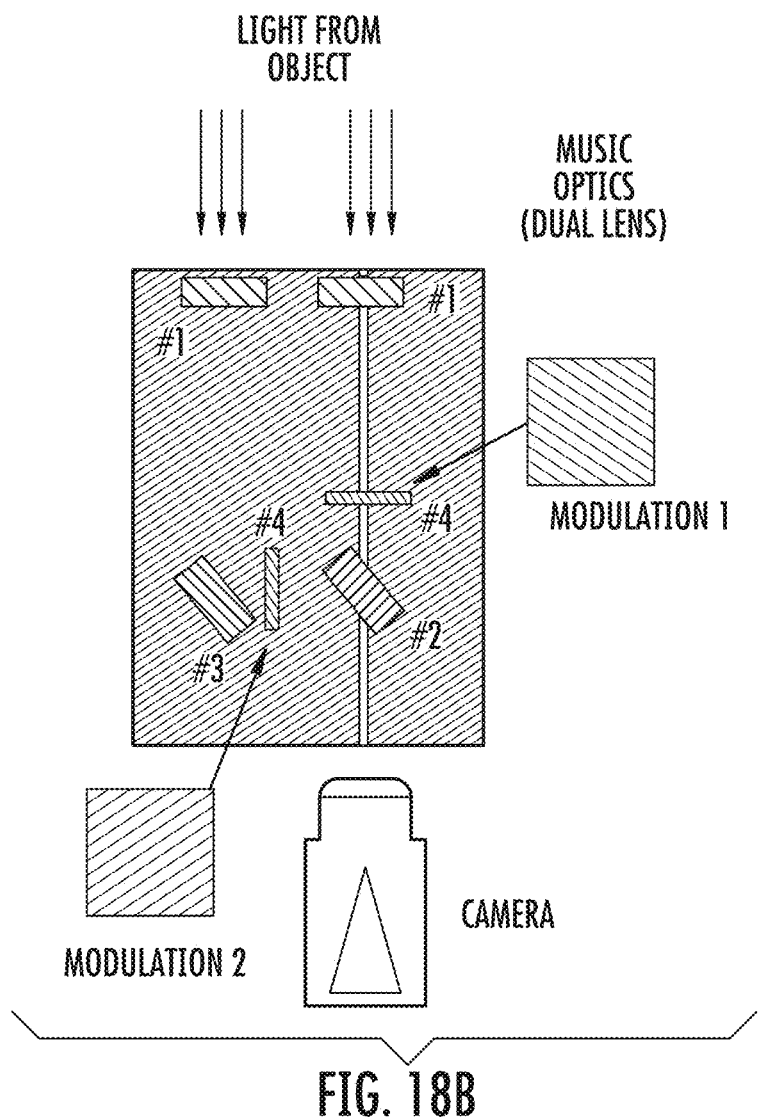
FIG. 18B shows a two-lens version of the system that can be used for very large objects. It also eliminates one of the beam splitters.

Light modulation techniques have shown great promise in imaging [10]. Techniques such as CUP [11, 12], structured illumination [13-15], FRAME [16] and MUSIC [17] have all been demonstrated for ultrafast-imaging or for resolution enhancement. However, the image multiplexing involved in the multiplexed structured image capture (MUSIC) technique can be used to not only store transient information from the same scene, but also multiple scenes at a given point in time. Image multiplexing exploits the fact that most of the important information in an image occupies the center of the Fourier domain (i.e. is low frequency information) [18]. Hence, the Fourier domain of an image is usually negligible away from the origin due to the low magnitude of high-frequency image components, meaning the image generally has a sparse Fourier domain. This sparseness is one of the key ideas behind compressed sensing techniques for imaging purposes. FIGS. 18A-B show two optical setups for multiplexing images to increase the field of view and FIG. 18C provides a diagrammatic representation of the effect of the multiplexing optical setups. The light is first optically split into two paths (i.e. channels), with each channel showing a different part of the scene. The adjustment the first beam splitter will determine which part of the scene goes to channel two. Each channel in the optical setup which will apply a unique modulation to the corresponding image by focusing onto a Ronchi ruling rotated to a unique angle. The information from both channels is then recombined using a beam splitter and simultaneously imaged by a camera with an achromatic lens. However, the unique modulations allow for each channel to be separated and restored in post-processing [13, 16, 19]. Finally, the images can be stitched together using image analysis software to yield the net larger field of view.

A mathematical description of MUSIC for field of view (FOV) extension begins by considering image information exiting the optical systems in FIG. 1., $I_G(\vec{r}, t)$, which consists of light that has traveled two paths:

$$I_G(\vec{r}, t) = \sum_{n=1}^{2} I_n(\vec{r}, t - \Delta t_{Dn}) M_n(\vec{r}) \varepsilon_n \quad (1)$$

Here, $I_n$ is the image information defined as:

$$I_n(\vec{r}, t) = \begin{cases} I_1(\vec{r}, t) & \text{Scene 1} \\ I_2(\vec{r}, t) & \text{Scene 2} \end{cases} \quad (2)$$

$M_n$ is the modulation applied by the Ronchi rulings, and $\varepsilon_n$ is the optical efficiency along path n. Also, $\Delta t_{Dn}$ is the time delay relative to path one caused by the extra travel distance. Assuming the camera gate is much longer than the time delay $\Delta t_{Dn}$, the approximation $\Delta t_{Dn} \approx 0$ can be made. This holds true for MHz and kHz imaging systems given that our system has $\Delta t_{D2} \sim 1$ ns. Therefore, both arms of the imaging system will contribute information from nearly the same moment in time. Note that the modulation masks consist of periodic stripes due to the structure of the Ronchi rulings. Also, note that vertical stripes can be modeled as period square waves in the x-direction [19]:

$$M(x, y) = M(x + T) = \begin{cases} 1 & |x| < T_1 \\ 0 & T_1 < x \le T/2 \end{cases} \quad (3)$$

Where T is the period of the modulation and $T_1 = T/4$. Combining Eq. (1) and Eq. (3) and taking the spatial Fourier transform yields:

$$I_G(\vec{k},t) = \sum_{n=1}^{2}\left[\varepsilon_n I_n(\vec{k},t) \otimes \sum_{m=-\infty}^{\infty} \frac{2\sin(mk_0 T_1)}{m}\delta(k_{xn} - mk_0)\right] \quad (4)$$

Here, $k_0$ is the fundamental spatial frequency for the modulation mask, and is the $k_{xn}$ is the x-spatial frequency variable for path n. Each path must have a unique modulation, which is best accomplished by rotation of the spatial modulation pattern. Since a coordinate rotation in the spatial domain corresponds to a rotation in the frequency domain, Eq. (4) becomes:

$$I_G(\vec{k},t) = \sum_{n=1}^{2}\left[\varepsilon_n I_n(\vec{k},t) \otimes \sum_{m=-\infty}^{\infty} \frac{2\sin(mk_0 T_1)}{m}\delta(k'_{xn} - mk_0)\right] \quad (5)$$

In Eq. (5), $k_{xn}' = k_x \cos\theta_n + k_y \sin\theta_n$ and $\theta_n$ is the rotation angle of the modulation pattern. Eq. (5) shows that the delta function will create copies of the original image's Fourier transform and shift it to various harmonics each while reducing amplitude. However, since these copies contain the original images information, but shifted to a unique frequency location corresponding to the modulation pattern, overlapped images can be separated. Recovery of images is done using an algorithm detailed in previous work, and was developed for structured illumination measurements [13, 19]. The algorithm multiplies the composite multiplexed image by sinusoidal functions to shift the information from one of the sinc function offsets to the center of the Fourier domain, and then a low-pass filter is used to isolate the Fourier information corresponding to one of the multiplexed images, which is then inverse-transformed to recover the image. We use a Gaussian filter for the filtering step, similar to our previous work with MUSIC [17, 19].

To show the implications of Eq. (5) in practice, a computer-based example of image multiplexing was done, as shown in FIGS. 19A-F. FIG. 19A represents the desired full scene. The input image has most of its Fourier domain information near the origin (i.e. low frequencies) as shown by FIG. 19B. By splitting the picture in two, applying unique binary modulation masks, and summing, the image in FIG. 19C was created; which would represent the image captured in the real experiment. FIG. 19D shows the spatial Fourier transform of FIG. 19C and features the copied information at the offset spatial frequency which corresponding to the applied modulations (30° and 300° for top and bottom scenes respectively). The images in FIGS. 19E-F show that each image was successfully split and recovered from the combined, overlapped image. The reduction in resolution occurs due to the low-pass filtering present in the image recovery algorithm and is dependent on the size (i.e. bandwidth) of the applied filter as discussed in previous works [17, 19]. Finally, note that sinusoidal modulation patterns are generally favorable, due to the lack of higher harmonic generation. If sinusoidal patterns are used, the second sum in Eq. (5) will be replaced by the sum of delta functions at $\pm k_0$, the modulation frequency. This also removes the higher-order harmonics associated with the sinc function, which can be problematic due to possible cross-talk between multiplexed images during recovery. However, square wave modulation is used here due to the Ronchi rulings/gratings used to modulate the images in the experiment.

2. Experiment Setup

Figure 20:
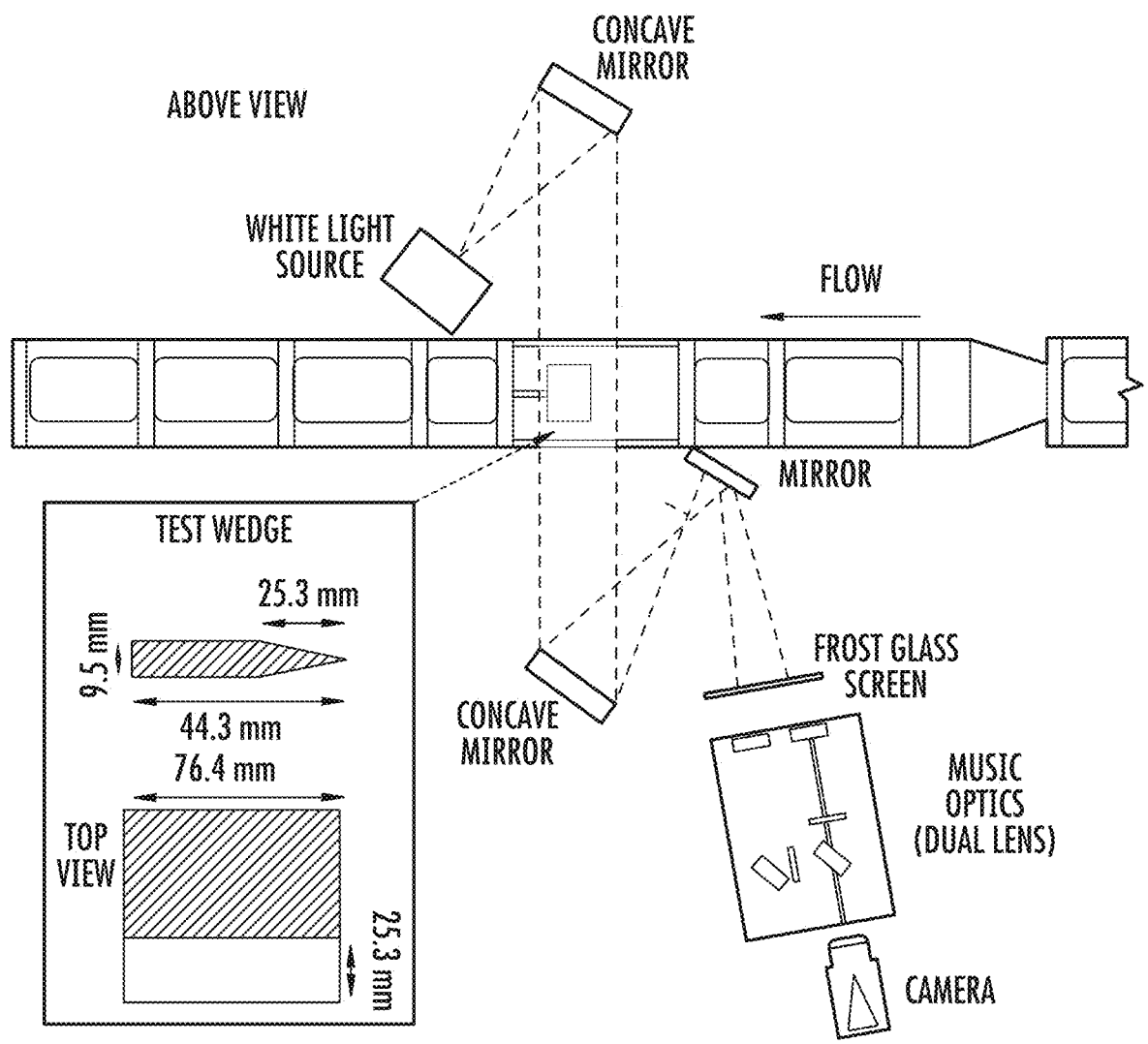
FIG. 20 is a diagram illustrating an example Wind tunnel Z-type schlieren setup.

The multiplexing apparatus was constructed it two ways, as shown in FIGS. 18A-B. Note that all beam splitters were 50R/50T, except for the first beam splitter in the single lens configuration which was 70R/30T. Rotated Ronchi rulings/gratings (5 cy/mm) were used to modulate the image in each path. All lenses in the system where achromatic lenses, and silver mirrors were used. All optics were 2" in diameter. An HS-PowerView camera was used for imaging of the USAF 1951 resolution target and for flame chemiluminescence imaging. A standard Nikon DLSR camera was used for schlieren imaging. For all cases, 2" achromatic lenses were used for the camera lens. Schlieren imaging, as shown in FIG. 20, was done in a supersonic wind tunnel with Mach 3 flow conditions. For flame chemiluminescence imaging, a methane diffusion flame was used with a tube inner diameter of 4.5 mm and a flow rate of 200 mL/min.

Results and Discussion 3.1 USAF Resolution Card

Figure 21A:
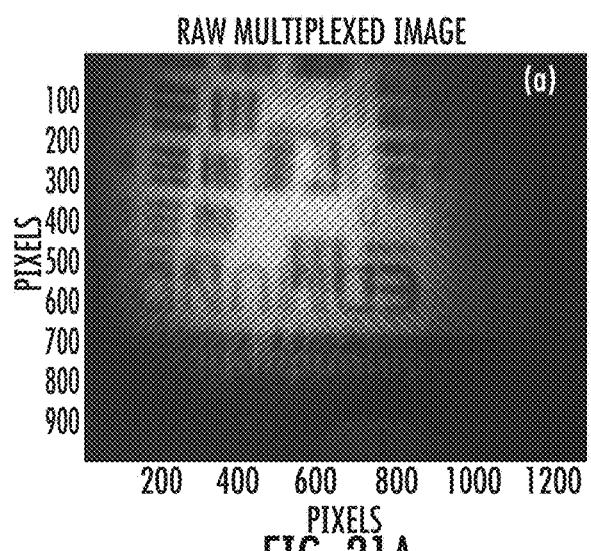
FIG. 21A shows a raw image of a USAF 1951 standard pattern with multiple views.
Figure 21B:
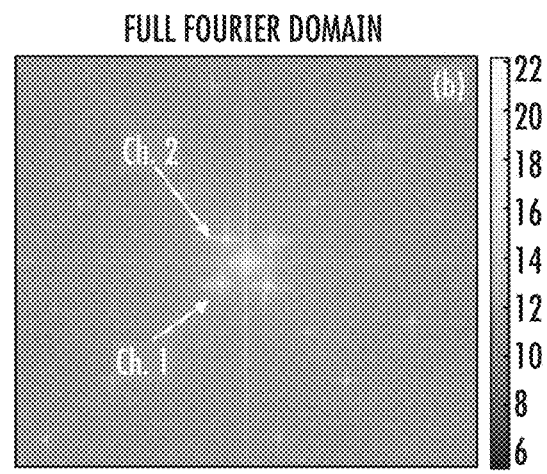
FIG. 21B shows its Fourier transform with logarithmic scaling.
Figure 21C:
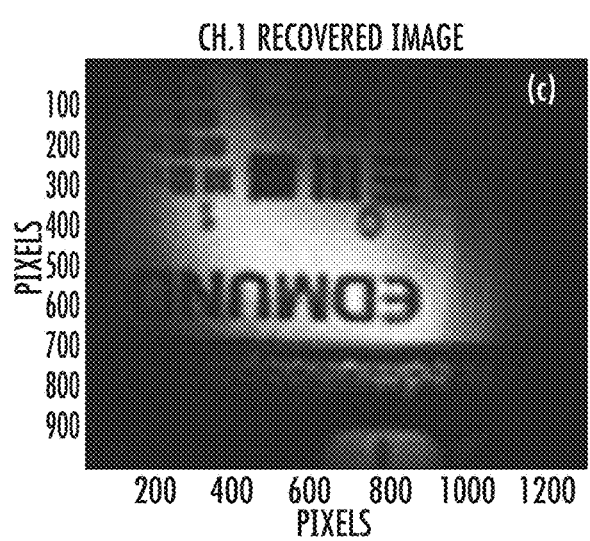
FIGS. 21C-21D show the recovered scenes for channel one and two.
Figure 21D:
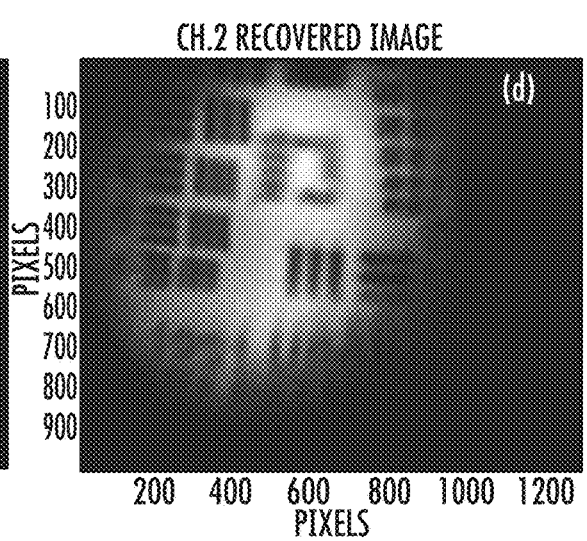

Experimental demonstration of the Multiplexed Structured Image Capture (MUSIC) technique for FOV extension was first carried out on a USAF 1951 optical test pattern to provide a standard for determining the quality of recovered images and to aid in alignment of recovered images from the two channels. FIGS. 21A-D show the results for multiplexed imaging of the USAF pattern target. In FIG. 21B, there are four offset regions in the Fourier domain with one pair corresponding to the modulation pattern in channel one and another pair for channel two. Only two offsets are unique due to symmetry of the Fourier domain. FIGS. 21C-D show the recovered images using the techniques discussed in previous work, which involve filtering and demodulation of the images[19]. Note that the extra lens in the path for channel two, as shown in FIG. 18A, inverts the image relative to channel one.

Figure 22A:
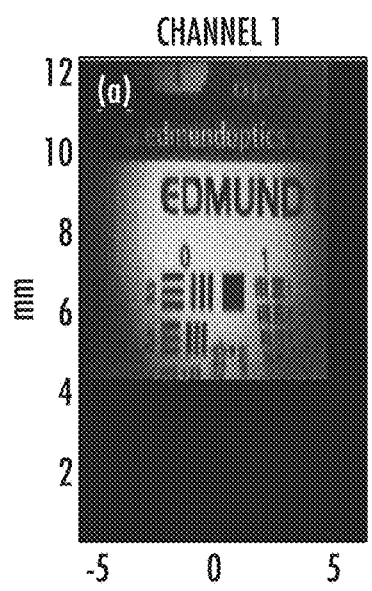
FIGS. 22A-22B show the ground truth images for each channel. Note that the displacement between the two channels has been done is post processing to show the true imaging location with respect to each other.
Figure 22B:
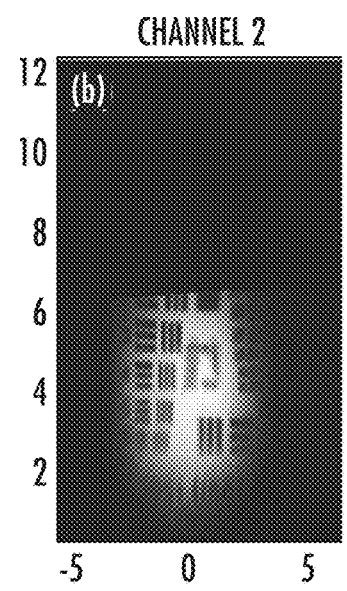
Figure 22C:
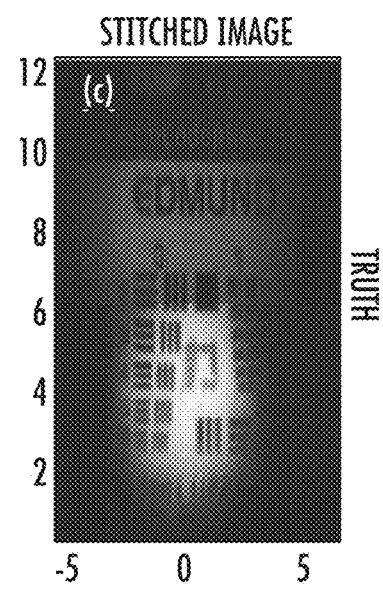
FIG. 22C shows the stitched together ground truth image.
Figure 22D:
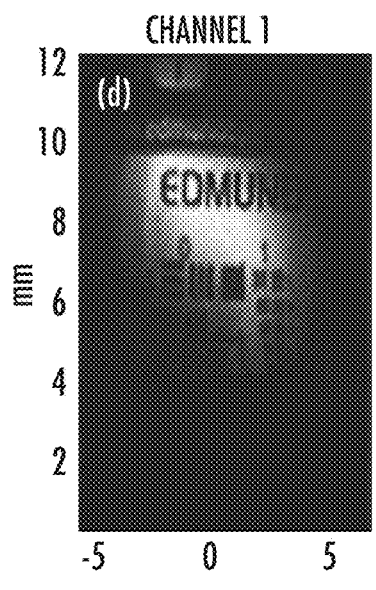
FIGS. 22D-22E show images recovered from the multiplexed image.
Figure 22E:
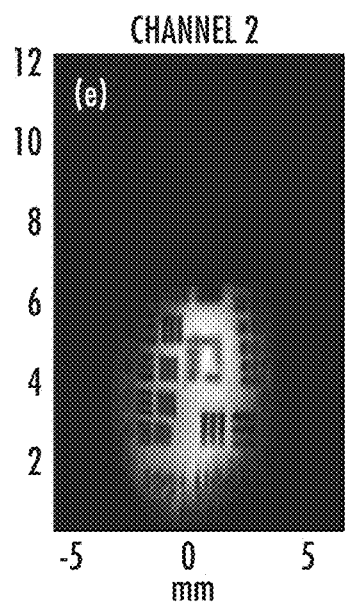
Figure 22F:
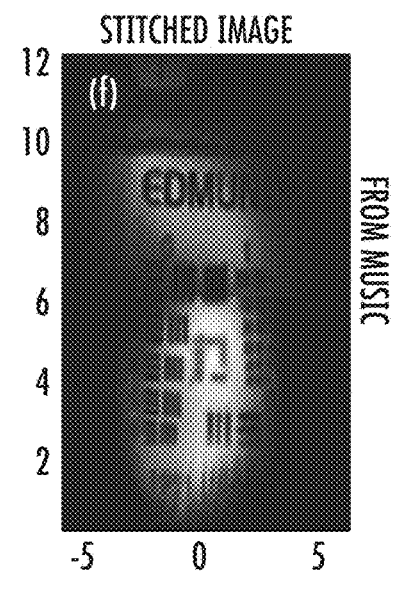
FIG. 22F shows the stitched together recovered images from the multiplexed results.

To establish proper truth images for comparison, Ronchi rulings were removed and imaging was done one channel at a time with one channel physically blocked. FIGS. 22A-C show the truth images. In FIGS. 22A-B, the images were properly scaled and displaced to correspond to the actual scene. This was also done for the multiplexed results in FIGS. 22D-E. FIGS. 22C and 22F show the stitched together images for the truth images and the MUSIC results respectively. The MUSIC results qualitatively show the same scene, but with slightly less resolution due to the filtering in the image recovery process. A 2D correlation coefficient between the truth and MUSIC images was calculated in MATLAB to be 0.9262.

3.2 Flame Chemiluminescence

Figure 23A:
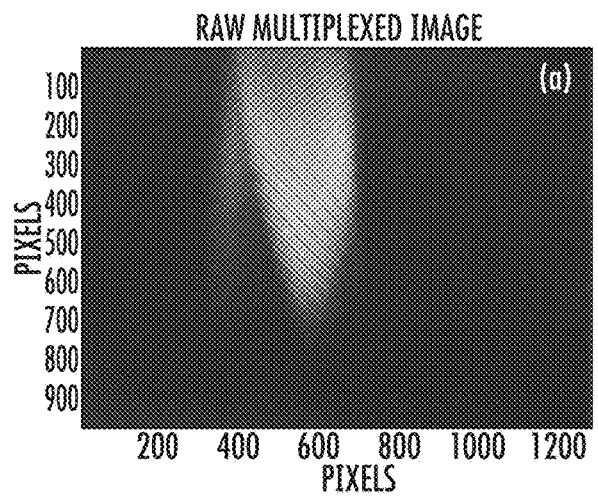
FIG. 23A illustrates raw flame chemiluminescence imaging using the MUSIC technique.
Figure 23B:
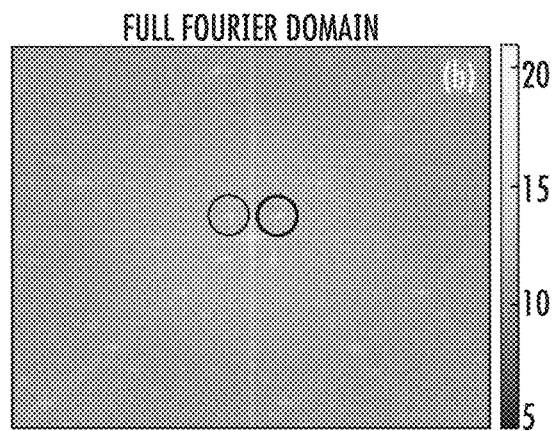
FIG. 23B shows the Fourier transform of the row image plotted in logarithmic scale.
Figure 23C:
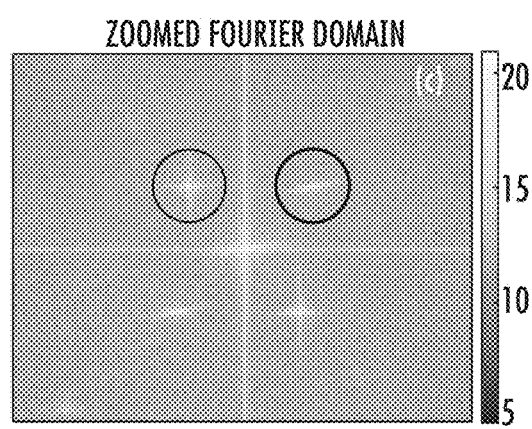
FIG. 23C shows a close-up of the important region for analysis. Note that the circles indicate channel one and channel two information. Exposure time was 2 ms.
Figure 24A:
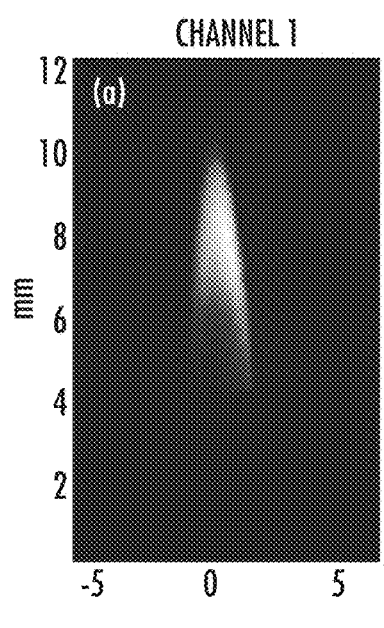
FIGS. 24A-24C illustrate flame chemiluminescence preliminary results. Recovered images from the image in FIGS. 23A-B, with FIGS. 24A and 24B the properly aligned to true spatial position. The stitched together image is shown in FIG. 24B.
Figure 24B:
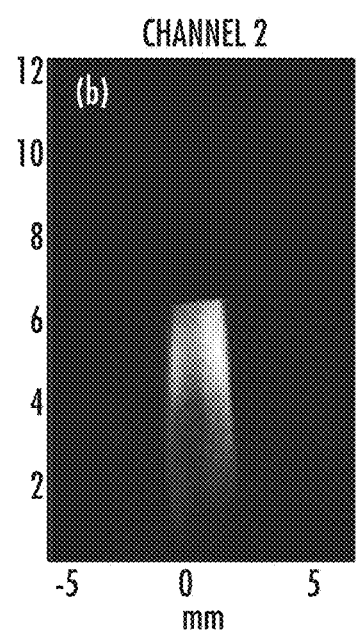
Figure 24C:
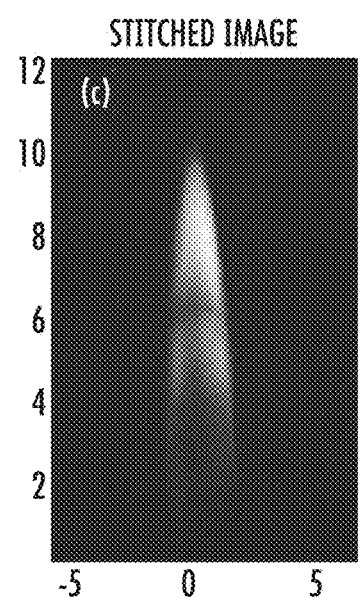

MUSIC imaging of methane flame chemiluminescence is shown in FIGS. 23A-C. Again, each channel has a marked, unique contribution to the image Fourier domain, as shown in FIG. 23B. For a general image, the distribution of power in the frequency domain is determined by the geometry of the scene. Since each channel is looking at a different part of the flame, there is a notable difference in the geometry in the images seen by channel. This is reflected by the drastically different shapes of the offsets shown in FIG. 23C, and further shows that each of the offsets corresponds only to a unique scene. The reconstructed and stitched together images are shown in FIGS. 24A-C. Note that the resolution of the image is slightly degraded by the image recovery process, specifically the application of a low-pass Gaussian filter with respect to the modulated information. Thus, a byproduct of the MUSIC technique is an inherent smoothing of the recovered images, with the degree of smoothing determined by the filter size during recovery. A small intensity discontinuity is present in the recovered images in FIGS. 24A-C that is due to imperfection in the alignment of the Ronchi grating and the image plane. The alignment is crucial since it optically performs the multiplication in Eq. (1). Since the alignment is not perfect in practice, the optical efficiency $\varepsilon_n$ has a spatial dependence rather than being a unique constant for each optical path. The result of this slight inefficiency is small variable intensity fluctuations since some information may not be copied and shifted correctly in the Fourier domain. For quantitative measurements, a calibration scheme is needed, and is an ongoing research effort at this time.

3.3 Schlieren Imaging

Figure 25A:
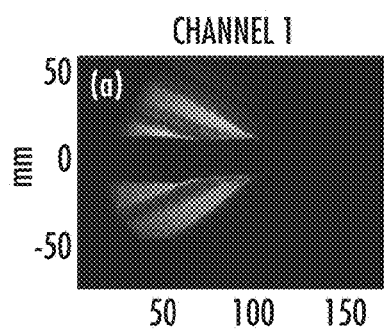
FIGS. 25A-25C illustrates schlieren imaging of a wedge in supersonic flow split into two channels by MUSIC. Truth schlieren image of the individual channels are shown in FIGS. 25A-25B and the stitched image is shown in FIG. 25C. The camera settings were an exposure time of 33 ms and ISO of 800.
Figure 25B:
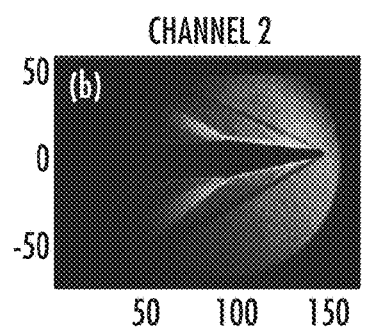
Figure 25C:
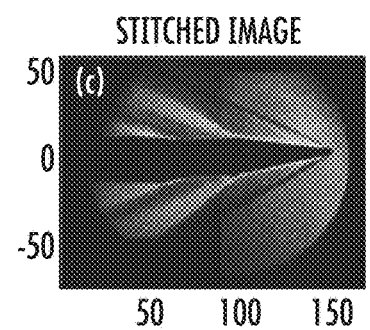
Figure 26A:
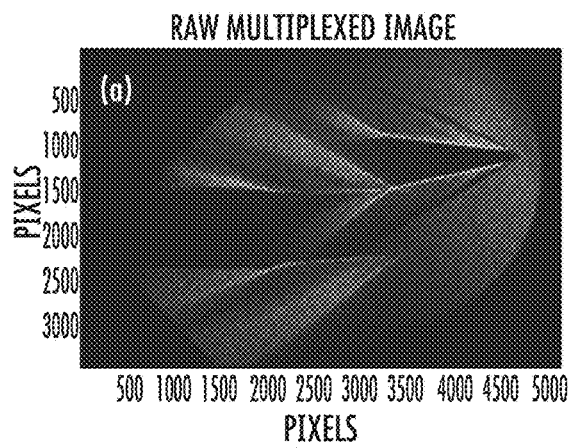
FIG. 26A shows a raw multiplexed schlieren image using MUSIC.
Figure 26B:
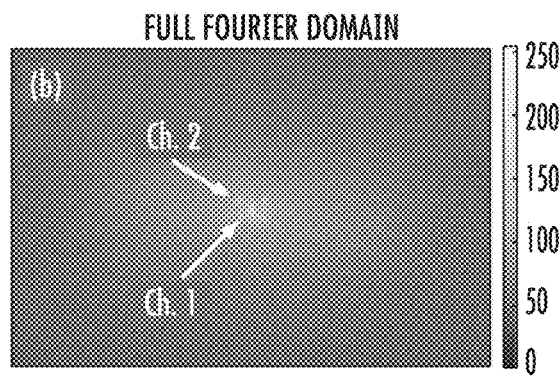
FIG. 26B shows the Fourier transform of the filtered image in logarithmic scale.
Figure 26C:
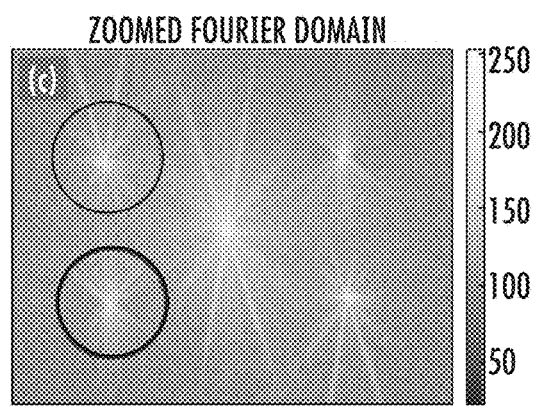
FIG. 26C shows a close-up of the individual channel information in the Fourier domain. Channels 1 and 2 are indicated by the circles.
Figure 27A:
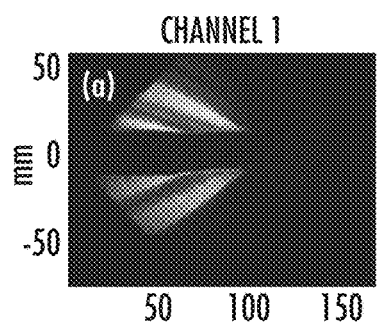
FIGS. 27A-27C show recovered images from the multiplexed image in FIGS. 26A-26C. Individual channel recovered images are shown in FIGS. 27A-27B and the stitched image is shown in FIG. 27C. The results are highly similar to the truth images in FIGS. 25A-25C.
Figure 27B:
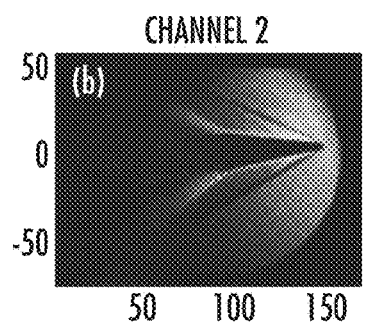
Figure 27C:
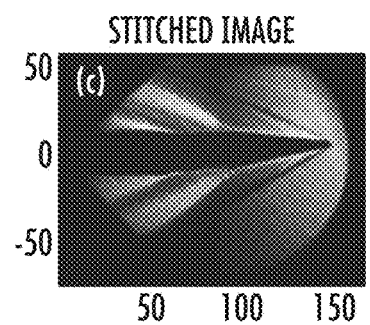

FIGS. 25A-C show truth images of the individual MUSIC channels and the stitched composite of the full schlieren image of a wedge in supersonic flow. FIGS. 26A-C show MUSIC applied to the schlieren image using the setup in FIG. 20. The raw filtered image in FIG. 25A shows that the individual regions imaged by the two channels comprised two partial images of the full wedge as shown in FIGS. 25A-B, overlapping the shock regions within the confines of the available camera window. The variances between the channel contributions to the Fourier domain shown in FIGS. 26B-C again demonstrate that the two channels captured unique, partial regions of the full scene. The reconstructed and stitched images are shown in FIGS. 27A-C. The results show high similarity to the truth images.

4. Summary and Conclusions

In summary, the MUSIC imaging technique has been successfully applied for extending the field of view during a single exposure. The technique was demonstrated for flame chemiluminescence and schlieren imaging, which are very popular imaging techniques in the aerospace and combustion optical diagnostics community. Note that although we applied the technique to look at scenes near each other, it can be applied for simultaneous imaging of two unrelated or vastly separated scenes, which could be useful for imaging of large scale models in wind-tunnels with a single camera. Furthermore, since high-speed cameras generally require restriction of the camera region of interest, MUSIC could allow researchers to capture more data to help offset this restriction. Two optical setups for FOV extension using MUSIC have been demonstrated, a single lens approach suitable for applications with optical access restrictions, and a more efficient dual-lens approach when no such restrictions exist. Though we only demonstrate two-scene imaging, additional scenes can be encoded into a single image using more patterns and optics. However, restrictions on reconstruction resolution limit the number of usable patterns, as discussed in literature [17, 19].

REFERENCES

1. G. S. Settles, *Schlieren and Shadowgraph Techniques: Visualizing Phenomena in Transparent Media* (Springer Berlin Heidelberg, 2012).
2. D. Baccarella, Q. Liu, A. Passaro, T. Lee, and H. Do, "Development and testing of the ACT-1 experimental facility for hypersonic combustion research," Measurement Science and Technology 27, 045902 (2016).
3. S. J. Laurence, A. Wagner, and K. Hannemann, "Experimental study of second-mode instability growth and breakdown in a hypersonic boundary layer using high-speed schlieren visualization," Journal of Fluid Mechanics 797, 471-503 (2016).
4. J. D. Miller, S. J. Peltier, M. N. Slipchenko, J. G. Mance, T. M. Ombrello, J. R. Gord, and C. D. Carter, "Investigation of transient ignition processes in a model scramjet pilot cavity using simultaneous 100 kHz formaldehyde planar laser-induced fluorescence and CH* chemiluminescence imaging," Proceedings of the Combustion Institute 36, 2865-2872 (2017).
5. N. Jiang, P. S. Hsu, J. G. Mance, Y. Wu, M. Gragston, Z. Zhang, J. D. Miller, J. R. Gord, and S. Roy, "High-speed 2D Raman imaging at elevated pressures," Opt. Lett. 42, 3678-3681 (2017).
6. J. D. Miller, M. N. Slipchenko, J. G. Mance, S. Roy, and J. R. Gord, "1-kHz two-dimensional coherent anti-Stokes Raman scattering (2D-CARS) for gas-phase thermometry," Opt. Express 24, 24971-24979 (2016).
7. B. A. Rankin, D. R. Richardson, A. W. Caswell, A. G. Naples, J. L. Hoke, and F. R. Schauer, "Chemiluminescence imaging of an optically accessible non-premixed rotating detonation engine," Combustion and Flame 176, 12-22 (2017).
8. B. R. Halls, D. J. Thul, D. Michaelis, S. Roy, T. R. Meyer, and J. R. Gord, "Single-shot, volumetrically illuminated, three-dimensional, tomographic laser-induced-fluorescence imaging in a gaseous free jet," Opt. Express 24, 10040-10049(2016).
9. T. R. Meyer, B. R. Halls, N. Jiang, M. N. Slipchenko, S. Roy, and J. R. Gord, "High-speed, three-dimensional tomographic laser-induced incandescence imaging of soot volume fraction in turbulent flames," Opt. Express 24, 29547-29555 (2016).
10. J. Liang, and L. V. Wang, "Single-shot ultrafast optical imaging," Optica 5, 1113-1127 (2018).
11. L. Gao, J. Liang, C. Li, and L. V. Wang, "Single-shot compressed ultrafast photography at one hundred billion frames per second," Nature 516, 74 (2014).
12. J. Liang, L. Gao, P. Hai, C. Li, and L. V. Wang, "Encrypted Three-dimensional Dynamic Imaging using Snapshot Time-of-flight Compressed Ultrafast Photography," Scientific Reports 5, 15504 (2015).
13. K. Dorozynska, and E. Kristensson, "Implementation of a multiplexed structured illumination method to achieve snapshot multispectral imaging," Opt. Express 25, 17211-17226 (2017).
14. E. Kristensson, and E. Berrocal, "Recent development of methods based on structured illumination for combustion studies," in *Imaging and Applied Optics* 2016(Optical Society of America, Heidelberg, 2016), p. LT4F.1.
15. M. Saxena, G. Eluru, and S. S. Gorthi, "Structured illumination microscopy," Adv. Opt. Photon. 7, 241-275 (2015).
16. A. Ehn, J. Bood, Z. Li, E. Berrocal, M. Aldön, and E. Kristensson, "FRAME: femtosecond videography for atomic and molecular dynamics," Light: Science &Amp; Applications 6, e17045 (2017).
17. M. Gragston, C. D. Smith, D. Kartashov, M. N. Shneider, and Z. Zhang, "Single-Shot Nanosecond-Resolution Multiframe Passive Imaging by Multiplexed Structured Image Capture," Opt. Express 26, 28441-28452 (2018).
18. D. L. Donoho, "Compressed sensing," IEEE Transactions on Information Theory 52, 1289-1306 (2006).

19. M. Gragston, C. D. Smith, and Z. Zhang, "High-speed flame chemiluminescence imaging using time-multiplexed structured detection," Appl. Opt. 57, 2923-2929 (2018).

Figure 28:
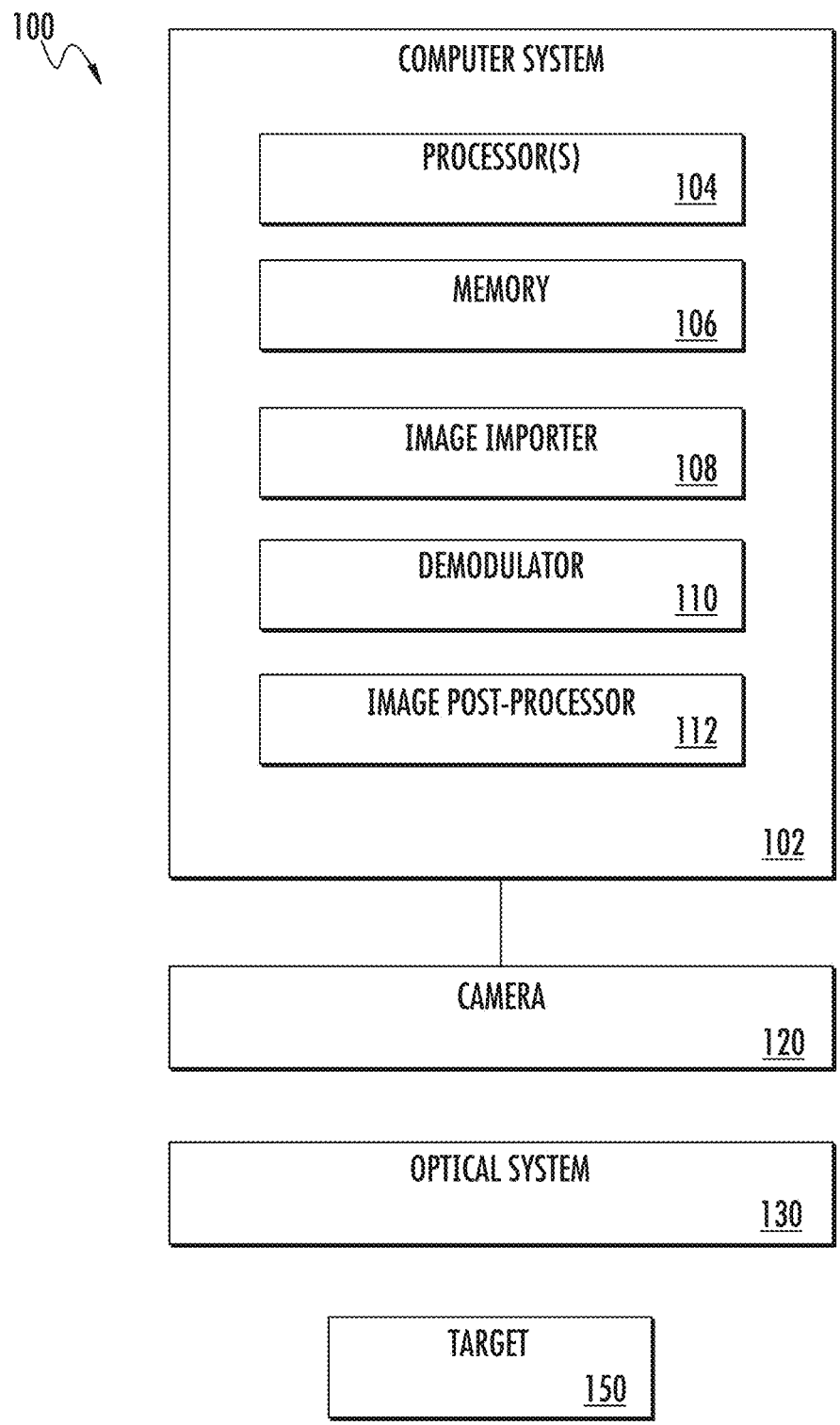
FIG. 28 is a block diagram of an example system 100 for high-speed imaging of a target using optical modulation.

FIG. 28 is a block diagram of an example system 100 for high-speed imaging of a target using optical modulation. The system 100 includes a target 150, e.g., a target that emits light. The system 100 includes an optical system 130 configured for optical modulating images of the target 150. For example, the optical system 130 can include an optical modulator, e.g., a DMD or a beamsplitter and multiple optical gratings, and one or more lenses.

The system 100 includes a camera 120 configured for capturing image frames that include multiple images modulated into a single image frame. The system 100 includes a computer system 102 including at least one processor 104 and memory 106 storing executable instructions for the processor 104.

The computer system 102 includes an image importer 108 configured for communicating with the camera 120 and for receiving images from the camera 120. The computer system 102 includes a demodulator 110, implemented on the processor 104, configured for demodulating images to recover, from each single image frame, a number of recovered image frames each depicting the target. The demodulator 110 can be configured to recover multiple recovered images each depicting the target at different times within an exposure window. The demodulator 110 can be configured to recover multiple recovered images each depicting the target from different fields of view at a same time. In general, the demodulator 110 is configured to perform selective filtering in the frequency domain to isolate the recovered images using data specifying modulation patterns of the optical system 130.

The system 100 can be configured for periodic optically modulated detection. The optical modulation is "periodic" in that different optical modulation patterns are applied at different pre-determined times (or on different optical paths, and therefore at different times) and are not applied randomly. For example, different optical modulation patterns can be applied at evenly spaced intervals across an exposure window across a camera, or at other intervals that can be programmed into the computer system 102 for demodulation.

Figure 29:
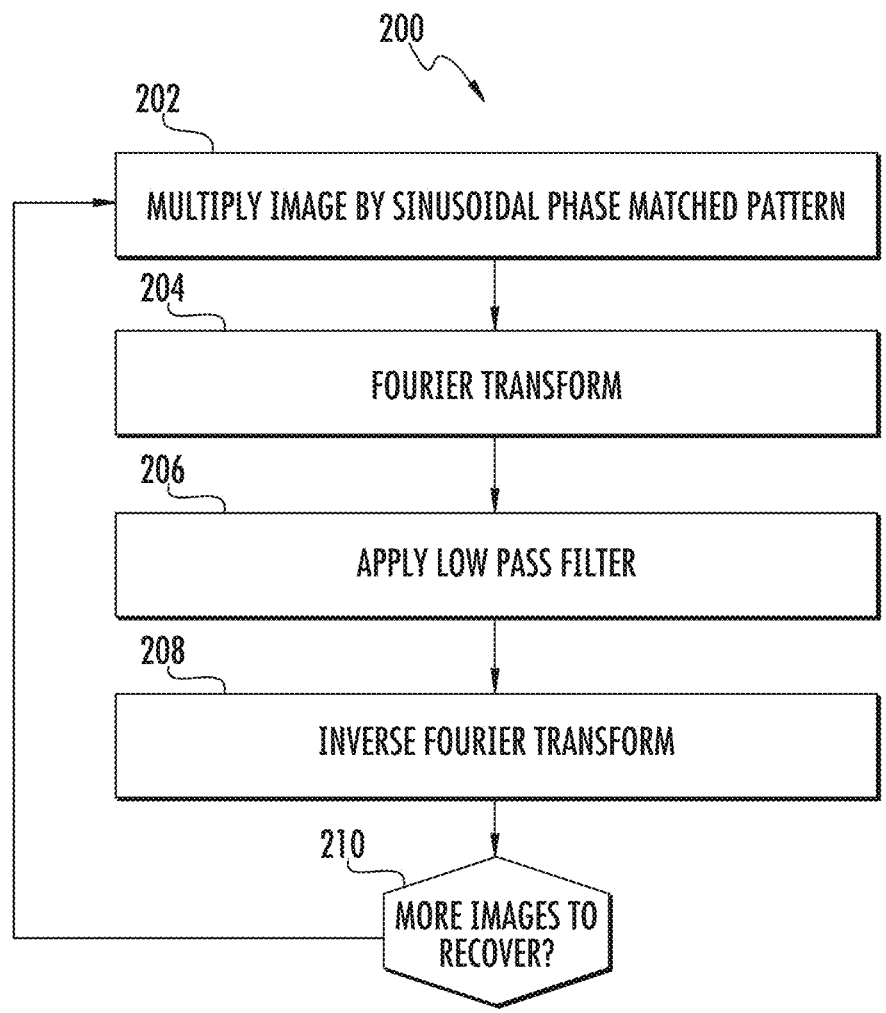
FIG. 29 is a flow diagram of an example method 200 for demodulating a single image frame to recover a number of recovered image frames.

FIG. 29 is a flow diagram of an example method 200 for demodulating a single image frame to recover a number of recovered image frames. The method 200 can be performed by the demodulator 110 of FIG. 28. In general, the method 200 includes shifting information to the center of the Fourier domain and low-pass filtering. The method 200 can include performing a correlation analysis to match the phase of the real modulated image to a known modulation pattern.

The method 200 includes multiplying the image by a sinusoidal phase matched pattern (202). The method 200 includes performing a Fourier transform on the resulting image (204). The method 200 includes applying a low pass filter to isolate one of the recovered image frames (206). The method 200 includes performing an inverse Fourier transform on the resulting image (208), which results in the recovered image. The method 200 includes determining whether there are more images to recover (210), and if so, repeating the method 200 (return to 202).

Figure 30:
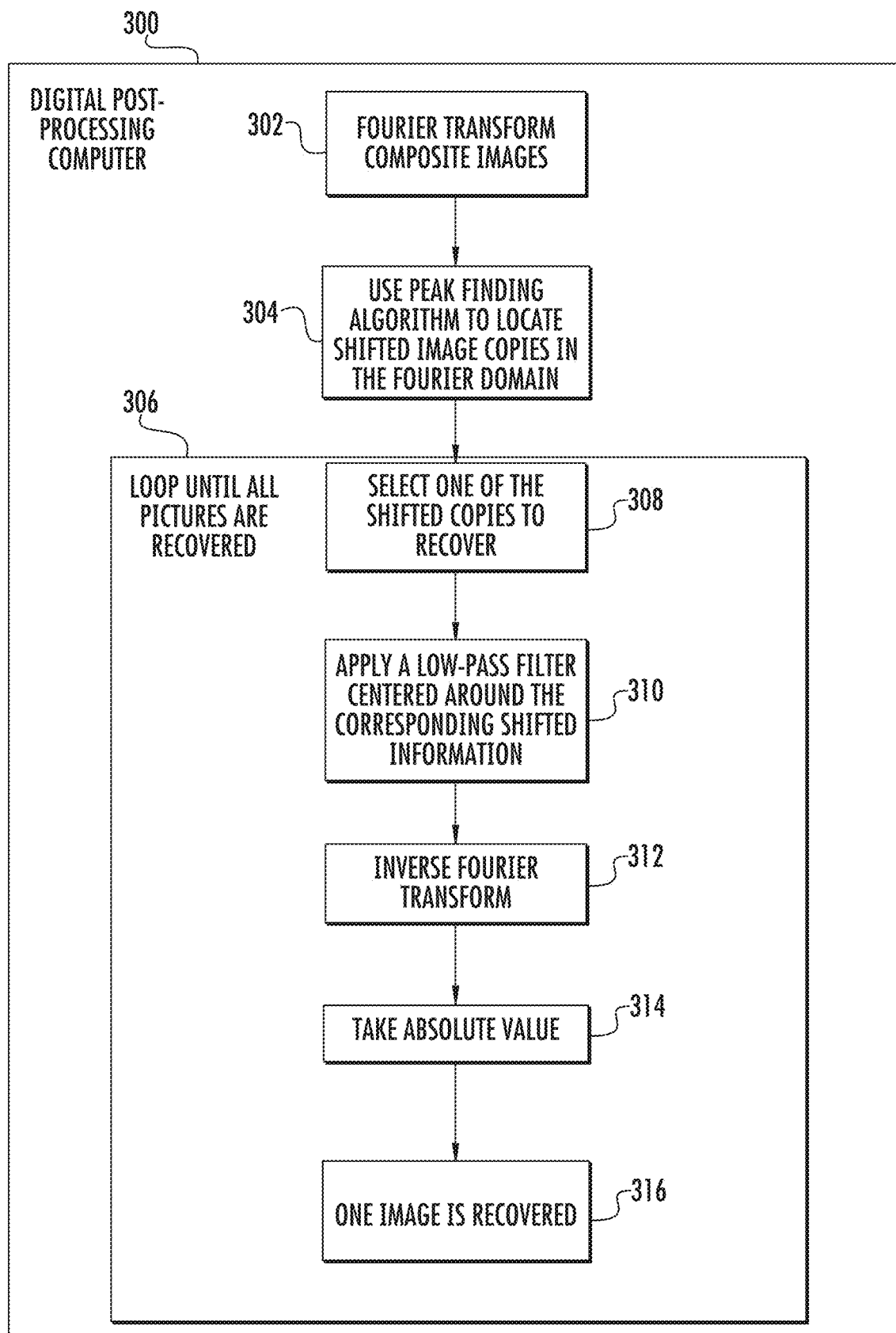
FIG. 30 is a block diagram including a flow diagram of an example method for demodulating image frames.

FIG. 30 is a block diagram including a flow diagram of an example method for demodulating image frames. The method can be performed on a digital post-processing computer 300, e.g., by the demodulator 110 of FIG. 28. The method includes performing a Fourier transform on a composite image, i.e., a single image frame presenting multiple images optically modulated into the composite image (302). The method includes using a peak finding algorithm to locate shifted image copies in the Fourier domain (304).

The method includes executing a loop 306 for each image to recover until all of the recovered images are recovered from the composite image. Executing the loop 306 includes selecting one of the shifted copies to recover (308) and applying a low-pass filter centered around the corresponding shifted information (310). Executing the loop includes performing an inverse Fourier transform (312) and taking the absolute value of the resulting image (314), which results in one image being recovered from the composite image. To further illustrate the method, consider the following discussion.

Consider Eq. 4 from Section II above, $$I_G(\vec{k}, t) = \Pi\left(\frac{t-t_0}{T_G}\right) \sum_{n=1}^{3} \left[\varepsilon_n I_n(\vec{k}, t - \Delta t_{Dn}) \otimes \sum_{m=-\infty}^{\infty} \frac{2\sin(mk_0 T_1)}{m} \delta(k'_{xn} - mk_0)\right]$$

The information on the right side of the operator represents can be rewritten with the coordinate system rotated to match the left hand side:

$$I_G(\vec{k}, t) =$$

$$\Pi\left(\frac{t-t_0}{T_G}\right) \sum_{n=1}^{3} \left[\varepsilon_n I_n(\vec{k}, t - \Delta t_{Dn}) \otimes \sum_{m=-\infty}^{\infty} \frac{2\sin(mk_{0n}T_1)}{m} \delta(\vec{k} - m\vec{k}_{0n})\right]$$

Since the limited pixel density and optical resolution of the system will limited the number of higher-order terms in the inner sum that actually appear in experimental data, the above can be written as:

$$I_G(\vec{k}, t) = \Pi\left(\frac{t-t_0}{T_G}\right)$$

$$\sum_{n=1}^{3} \left[\varepsilon_n I_n(\vec{k}, t - \Delta t_{Dn}) \otimes \left(a_1 \delta(\vec{k} - \vec{k}_{0n}) + a_2 \delta(\vec{k} - 0) + a_3 \delta(\vec{k} + \vec{k}_{0n})\right)\right]$$

where only the fundamental and first-order terms contribute significant information and the coefficients "a" are constants from the coefficient in the inner sum. Now for the new reconstruction process, we simply apply the low pass filter centered around the still shifted information. Since we only apply this to one pattern at a time, the effect on the previous equation is (choosing information for n=1 for example):

$$I_{G,1}(\vec{k}, t) = \Pi\left(\frac{t-t_0}{T_G}\right) \varepsilon_n I_n(\vec{k}, t - \Delta t_{D1}) \otimes a_1 \delta(\vec{k} - \vec{k}_{01})$$

The convolution with this delta function will perfectly sample the images Fourier transform but will shift it:

$$I_{G,1}(\vec{k}, t) = \Pi\left(\frac{t-t_0}{T_G}\right) a_1 \varepsilon_n I_n(\vec{k} - \vec{k}_{01}, t - \Delta t_{D1})$$

Taking the inverse Fourier transformation with respect to the spatial coordinates gives:

$$I_{G,1}(\vec{r}, t) = \Pi\left(\frac{t-t_0}{T_G}\right) a_1 \varepsilon_n I_n(\vec{r}, t - \Delta t_{D1}) e^{i\vec{K}_{01} \cdot \vec{r}}$$

So taking the absolute value will eliminate the phase factor:

$$|I_{G,1}(\vec{r}, t)| = \Pi\left(\frac{t-t_0}{T_G}\right) a_1 \varepsilon_n |I_n(\vec{r}, t - \Delta t_{D1})|$$

Therefore, the image is recovered with no modulation leftover and corresponds to the correct portion of the camera gate. There is a reduction in amplitude.

In brief, the executing the method includes performing steps to:
1. Take the Fourier transform of the modulated image.
2. Select one of the shifted copies and apply a filter centered around that copy. Everything outside of the filter is set to zero.
3. Inverse Fourier transform the result.
4. Take the absolute value. The image is now recovered.
5. Repeat for each of the encoded images.

Accordingly, while the methods and systems have been described in reference to specific embodiments, features, and illustrative embodiments, it will be appreciated that the utility of the subject matter is not thus limited, but rather extends to and encompasses numerous other variations, modifications and alternative embodiments, as will suggest themselves to those of ordinary skill in the field of the present subject matter, based on the disclosure herein.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims.

What is claimed is:

1. A system for imaging a target, the system comprising:
an optical modulator configured for applying, at each time of a plurality of times of an exposure window, a respective optical modulation pattern to a received image of the target to output a modulated image;
a camera configured for capturing a single image frame for the exposure window by receiving, at each of time of the plurality of times of the exposure window, the modulated image of the target; and
a demodulator implemented on a computer system comprising at least one processor, wherein the demodulator is configured for demodulating the single image frame based on the optical modulation patterns to recover a plurality of recovered image frames each depicting the target at a respective recovered time within the exposure window;
wherein demodulating the single image frame comprises, for each recovered image frame, multiplying the single image frame by a sinusoidal phase matched pattern, applying a Fourier transform, applying a low pass filter, and applying an inverse Fourier transform.

2. The system of claim 1, wherein multiplying the single image frame by a sinusoidal phase matched pattern comprises shifting a first-order harmonic for the recovered image frame to a center of a spatial frequency domain for the Fourier transform.

3. The system of claim 1, wherein the optical modulator comprises a digital micromirror device comprising an array of micromirrors and a controller storing digital specifications of the optical modulation patterns.

4. The system of claim 1, wherein the optical modulator comprises a plurality of optical gratings.

5. The system of claim 1, comprising one or more lenses configured to focus light emitted by the target onto the optical modulator.

6. A system for imaging a target, the system comprising:
an optical modulator configured for applying, at each time of a plurality of times of an exposure window, a respective optical modulation pattern to a received image of the target to output a modulated image;
a camera configured for capturing a single image frame for the exposure window by receiving, at each of time of the plurality of times of the exposure window, the modulated image of the target; and
a demodulator implemented on a computer system comprising at least one processor, wherein the demodulator is configured for demodulating the single image frame based on the optical modulation patterns to recover a plurality of recovered image frames each depicting the target at a respective recovered time within the exposure window;
wherein the optical modulator is configured to apply the optical modulation patterns to upshift, in a spatial frequency domain, the received images to different patterned hexagons in the spatial frequency domain.

7. A method for imaging a target, the method comprising:
applying, at each time of a plurality of times of an exposure window, a respective optical modulation pattern, using an optical modulator, to a received image of the target to output a modulated image;
capturing, at a camera, a single image frame for the exposure window by receiving, at each of time of the plurality of times of the exposure window, the modulated image of the target; and
demodulating, at a computer system comprising at least one processor, the single image frame based on the optical modulation patterns to recover a plurality of recovered image frames each depicting the target at a respective recovered time within the exposure window;
wherein demodulating the single image frame comprises, for each recovered image frame, multiplying the single image frame by a sinusoidal phase matched pattern, applying a Fourier transform, applying a low pass filter, and applying an inverse Fourier transform.

8. The method of claim 7, wherein multiplying the single image frame by a sinusoidal phase matched pattern comprises shifting a first-order harmonic for the recovered image frame to a center of a spatial frequency domain for the Fourier transform.

9. The method of claim 7, wherein the optical modulator comprises a digital micromirror device comprising an array of micromirrors and a controller storing digital specifications of the optical modulation patterns.

10. The method of claim 7, wherein the optical modulator comprises a plurality of optical gratings.

11. The method of claim 7, comprising focusing light emitted by the target onto the optical modulator using one or more lenses.

12. A method for imaging a target, the method comprising:
applying, at each time of a plurality of times of an exposure window, a respective optical modulation pattern, using an optical modulator, to a received image of the target to output a modulated image;
capturing, at a camera, a single image frame for the exposure window by receiving, at each of time of the plurality of times of the exposure window, the modulated image of the target; and
demodulating, at a computer system comprising at least one processor, the single image frame based on the optical modulation patterns to recover a plurality of recovered image frames each depicting the target at a respective recovered time within the exposure window;
wherein the optical modulator is configured to apply the optical modulation patterns to upshift, in a spatial frequency domain, the received images to different patterned hexagons in the spatial frequency domain.

13. A system for imaging a target, the system comprising:
one or more beam splitters configured for separating a received image of the target into a plurality of optical paths each having a different optical length, each path including a respective optical modulator configured to output a respective modulated image of the target;
one or more beam combiners configured for combining the modulated images;
a camera configured for capturing a single image frame for an exposure window by receiving, at each of time of the plurality of times of the exposure window, an output from the one or more beam combiners of an optical combination of the modulated images of the target; and
a demodulator implemented on a computer system comprising at least one processor, wherein the demodulator is configured for demodulating the single image frame to recover a plurality of recovered image frames each depicting the target at a respective recovered time within the exposure window;
wherein demodulating the single image frame comprises performing selective filtering in the frequency domain to isolate the recovered images using data specifying modulation patterns of the optical modulators.

14. The system of claim 13, wherein each optical modulator comprises a Ronchi ruling having a unique optical rotation.

15. A system for imaging a target, the system comprising:
an optical modulator configured for applying, to each field of view of a plurality of fields of view of the target, a respective optical modulation pattern to a received image of the target to output a modulated image;
a camera configured for capturing a single image frame for the plurality of fields of view by receiving the modulated images of the target; and
a demodulator implemented on a computer system comprising at least one processor, wherein the demodulator is configured for recovering, from the single image frame, a plurality of recovered image frames each depicting the target from a respective field of view;
wherein the demodulator is configured for performing selective filtering in the frequency domain to isolate the recovered images using data specifying modulation patterns, and wherein the demodulator is configured for combining the recovered image frames to create a single full scene image frame.

16. The system of claim 15, wherein the optical modulator comprises a digital micromirror device or a plurality of optical gratings, and wherein the system comprises one or more lenses configured for focusing light emitted by the target onto the optical modulator.

* * * * *